(12) United States Patent
Chung

(10) Patent No.: US 11,673,988 B2
(45) Date of Patent: Jun. 13, 2023

(54) ELECTRICALLY CONDUCTIVE MULTI-BLOCK POLYMERS AND METHODS OF MAKING THE SAME

(71) Applicant: The Florida State University Research Foundation, Inc., Tallahassee, FL (US)

(72) Inventor: Hoyong Chung, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 359 days.

(21) Appl. No.: 17/143,275

(22) Filed: Jan. 7, 2021

(65) Prior Publication Data
US 2021/0206900 A1    Jul. 8, 2021

Related U.S. Application Data

(60) Provisional application No. 62/958,001, filed on Jan. 7, 2020.

(51) Int. Cl.
C08F 293/00    (2006.01)

(52) U.S. Cl.
CPC ...... *C08F 293/005* (2013.01); *C08F 2438/01* (2013.01)

(58) Field of Classification Search
CPC .... C08G 2261/1332; C08G 2261/3223; C08F 2438/01; C08F 293/005
See application file for complete search history.

(56) References Cited

U.S. PATENT DOCUMENTS

2009/0294735 A1*  12/2009  Yoshida ................ H01B 1/124
                                                    252/500
2021/0317352 A1*  10/2021  Chung ...................... C09J 9/02

OTHER PUBLICATIONS

Irawan Praymudya Florida State University Thesis (Year: 2018).*
Lu et al. Biomaterials 33, 378-394 (Year: 2012).*
Kim et al. Chem. Mater. 2019, 31, 8358-8365 (Year: 2019).*
Harper et al. Appl. Mater. Interfaces 2017, 9, 1830-1839 (Year: 2017).*
Kim, M.; Butler, M. F.; Pramudya, I.; Lee, C.; Chung, H., "Metal-Free Electrically Conductive Bioinspired Adhesive Polymers." Chem. Mater. 2019, 31, 8358-8365.
Liu, D.; Zhao, Y.; Tan, R.; Tian, L. L.; Liu, Y. D.; Chen, H. B.; Pan, F., "Novel Conductive Binder for High-Performance Silicon Anodes in Lithium Ion Batteries." Nano Energy 2017, 36, 206-212.
Chen, H.; Ling, M.; Hencz, L.; Ling, H. Y.; Li, G.; Lin, Z.; Liu, G.; Zhang, S., "Exploring Chemical, Mechanical, and Electrical Functionalities of Binders for Advanced Energy-Storage Devices." Chem Rev 2018, 118 (18), 8936-8982.
Lee, K.; Lee, J.; Choi, S.; Char, K.; Choi, J. W., "Thiol-Ene Click Reaction for Fine Polarity Tuning of Polymeric Binders in Solution-Processed All-Solid-State Batteries." ACS Energy Letters 2019, 4 (1), 94-101.
Goda, T.; Miyahara, Y., "Electrodeposition of Zwitterionic Pedot Films for Conducting and Antifouling Surfaces." Langmuir 2019, 35 (5), 1126-1133.
Wang, M.; Kovacik, P.; Gleason, K. K., "Chemical Vapor Deposition of Thin, Conductive, and Fouling-Resistant Polymeric Films." Langmuir 2017, 33 (40), 10623-10631.
Cao, B.; Lee, C.-J.; Zeng, Z.; Cheng, F.; Xu, F.; Cong, H.; Cheng, G., "Electroactive Poly(Sulfobetaine-3,4-Ethylenedioxythiophene) (Psbedot) with Controllable Antifouling and Antimicrobial Properties." Chem Sci 2016, 7 (3), 1976-1981.
Lee, C.-J.; Wang, H.; Young, M.; Li, S.; Cheng, F.; Cong, H.; Cheng, G., "Structure-Function Study of Poly(Sulfobetaine 3,4-Ethylenedioxythiophene) (Psbedot) and Its Derivatives." Acta Biomater 2018, 75, 161-170.
Wu, J.-G.; Chen, J.-H.; Liu, K.-T.; Luo, S.-C., "Engineering Antifouling Conducting Polymers for Modern Biomedical Applications." ACS Applied Materials & Interfaces 2019, 11 (24), 21294-21307.
Lu, L. F.; Cao, X. J.; Qi, S. H., "Properties Investigation on Electrically Conductive Adhesives Based on Acrylate Resin Filled with Silver Microsheets and Silver Plating Carbon Fibers." J Adhes Sci Technol 2017, 31 (16), 1747-1757.
Ji, Y. H.; Liu, Y.; Huang, G. W.; Shen, X. J.; Xiao, H. M.; Fu, S. Y., "Ternary Ag/Epoxy Adhesive with Excellent Overall Performance." Acs Applied Materials & Interfaces 2015, 7 (15), 8041-8052.
Ma, H.; Qiu, H.; Qi, S. H., "Electrically Conductive Adhesives Based on Acrylate Resin Filled with Silver-Plated Graphite Nanosheets and Carbon Nanotubes." J Adhes Sci Technol 2015, 29 (20), 2233-2244.
Zhang, Y.; Qi, S. H.; Wu, X. M.; Duan, G. C., "Electrically Conductive Adhesive Based on Acrylate Resin Filled with Silver Plating Graphite Nanosheet." Synthetic Met 2011, 161 (5-6), 516-522.
Liang, S.; Zhang, Y. Y.; Wang, H. B.; Xu, Z. Y.; Chen, J. R.; Bao, R.; Tan, B. Y.; Cui, Y. L.; Fan, G. W.; Wang, W. X.; Wang, W.; Liu, W. G., "Paintable and Rapidly Bondable Conductive Hydrogels as Therapeutic Cardiac Patches." Adv Mater 2018, 30 (23).
Khandelwal, V.; Sahoo, S. K.; Kumar, A.; Manik, G., "Study on the Effect of Carbon Nanotube on the Properties of Electrically Conductive Epoxy/Polyaniline Adhesives." Journal of Materials Science: Materials in Electronics 2017, 28 (19), 14240-14251.
Wang, M.; Baek, P.; Akbarinejad, A.; Barker, D.; Travas-Sejdic, J., "Conjugated Polymers and Composites for Stretchable Organic Electronics." J Mater Chem C 2019, 7 (19), 5534-5552.
Czech, Z.; Kowalczyk, A.; Pelech, R.; Wrobel, R. J.; Shao, L.; Bai, Y.; Swiderska, J., "Using of Carbon Nanotubes and Nano Carbon Black for Electrical Conductivity Adjustment of Pressure-Sensitive Adhesives." Int J Adhes Adhes 2012, 36, 20-24.
Fernández, M.; Landa, M.; Muñoz, M. E.; Santamaría, A., "Tackiness of an Electrically Conducting Polyurethane-Nanotube Nanocomposite." Int J Adhes Adhes 2010, 30 (7), 609-614.

(Continued)

*Primary Examiner* — Mark S Kaucher
(74) *Attorney, Agent, or Firm* — Meunier Carlin & Curfman LLC

(57) ABSTRACT

Disclosed are multi-block polymers and blends thereof having high electrical conductivity and adhesion. Also disclosed herein are methods of making the same.

23 Claims, 3 Drawing Sheets

(56) References Cited

OTHER PUBLICATIONS

Singh, M.; Webster, R. D.; J. Steele, T. W., "Voltaglue Electroceutical Adhesive Patches for Localized Voltage Stimulation." ACS Applied Bio Materials 2019, 2 (6), 2633-2642.
Kim, S.; Jang, L. K.; Park, H. S.; Lee, J. Y., "Electrochemical Deposition of Conductive and Adhesive Polypyrrole-Dopamine Films." Sci Rep-Uk 2016, 6, 30475.
Qiao, W.; Bao, H.; Li, X.; Jin, S.; Gu, Z., "Research on Electrical Conductive Adhesives Filled with Mixed Filler." Int J Adhes Adhes 2014, 48, 159-163.
Wang, Y.; Huang, F.; Chen, X.; Wang, X. W.; Zhang, W.-B.; Peng, J.; Li, J.; Zhai, M., "Stretchable, Conductive, and Self-Healing Hydrogel with Super Metal Adhesion." Chem Mater 2018, 30 (13), 4289-4297.
Bhat, K. S.; Ahmad, R.; Wang, Y.; Hahn, Y.-B., "Low-Temperature Sintering of Highly Conductive Silver Ink for Flexible Electronics." J Mater Chem C 2016, 4 (36), 8522-8527.
Ouyang, L. Q.; Wei, B.; Kuo, C. C.; Pathak, S.; Farrell, B.; Martin, D. C., "Enhanced Pedot Adhesion on Solid Substrates with Electrografted P(Edot-Nh2)." Sci Adv 2017, 3 (3).
Khairul Anuar, S.; Mariatti, M.; Azizan, A.; Chee Mang, N.; Tham, W. T., "Effect of Different Types of Silver and Epoxy Systems on the Properties of Silver/Epoxy Conductive Adhesives." Journal of Materials Science: Materials in Electronics 2011, 22 (7), 757-764.
Kubo, Y.; Tanaka, H.; Saito, Y.; Mizoguchi, A., "Fabrication of a Bilayer Structure of Cu and Polyimide to Realize Circuit Microminiaturization and High Interfacial Adhesion in Flexible Electronic Devices." ACS Applied Materials & Interfaces 2018, 10 (51), 44589-44602.
Kishi, H.; Tanaka, S.; Nakashima, Y.; Saruwatari, T., "Self-Assembled Three-Dimensional Structure of Epoxy/Polyethersulphone/Silver Adhesives with Electrical Conductivity." Polymer 2016, 82, 93-99.
Balint, R.; Cassidy, N. J.; Cartmell, S. H., "Conductive Polymers: Towards a Smart Biomaterial for Tissue Engineering." Acta Biomater 2014, 10 (6), 2341-2353.
Le, T. H.; Kim, Y.; Yoon, H., "Electrical and Electrochemical Properties of Conducting Polymers." Polymers-Basel 2017, 9 (4).
Swager, T. M., "50th Anniversary Perspective: Conducting/Semiconducting Conjugated Polymers. A Personal Perspective on the Past and the Future." Macromolecules 2017, 50 (13), 4867-4886.
Lee, B. P.; Messersmith, P. B.; Israelachvili, J. N.; Waite, J. H., "Mussel-Inspired Adhesives and Coatings." Annu Rev Mater Res 2011, 41, 99-132.
Sedó, J.; Saiz-Poseu, J.; Busqué, F.; Ruiz-Molina, D., "Catechol-Based Biomimetic Functional Materials." Adv Mater 2013, 25 (5), 653-701.
Hofman, A. H.; van Hees, I. A.; Yang, J.; Kamperman, M., "Bioinspired Underwater Adhesives by Using the Supramolecular Toolbox." Adv Mater 2018, 30 (19).
Kayser, L. V.; Lipomi, D. J., "Stretchable Conductive Polymers and Composites Based on Pedot and Pedot:Pss." Adv Mater 2019, 31 (10), 1806133.
Park, S. J.; Zhao, H.; Ai, G.; Wang, C.; Song, X. Y.; Yuca, N.; Battaglia, V. S. Yang, W. L.; Liu, G., "Side-Chain Conducting and Phase-Separated Polymeric Binders for High-Performance Silicon Anodes in Lithium-Ion Batteries." J Am Chem Soc 2015, 137 (7), 2565-2571.
Zhao, H.; Wei, Y.; Wang, C.; Qiao, R. M.; Yang, W. L.; Messersmith, P. B.; Liu, G., "Mussel-Inspired Conductive Polymer Binder for Si-Alloy Anode in Lithium-Ion Batteries." Acs Applied Materials & Interfaces 2018, 10 (6), 5440-5446.

* cited by examiner

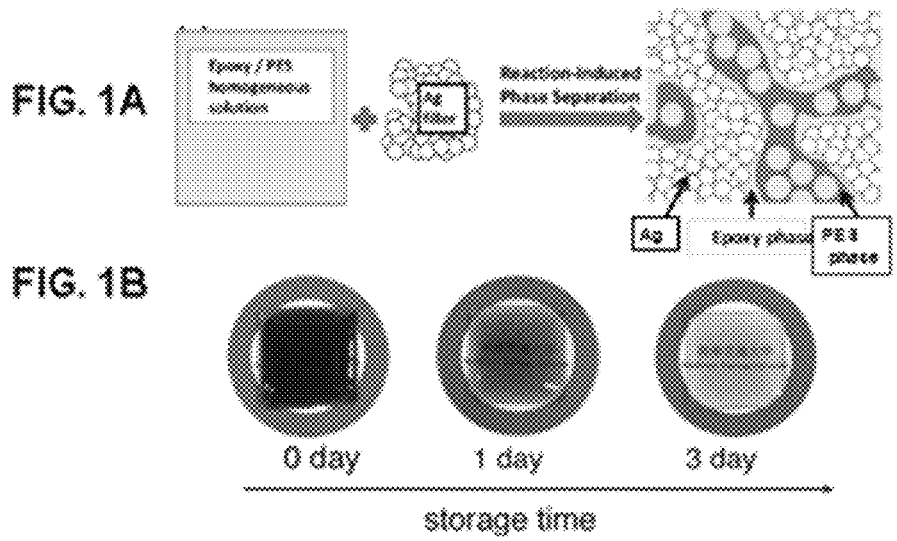
FIG. 1A
FIG. 1B
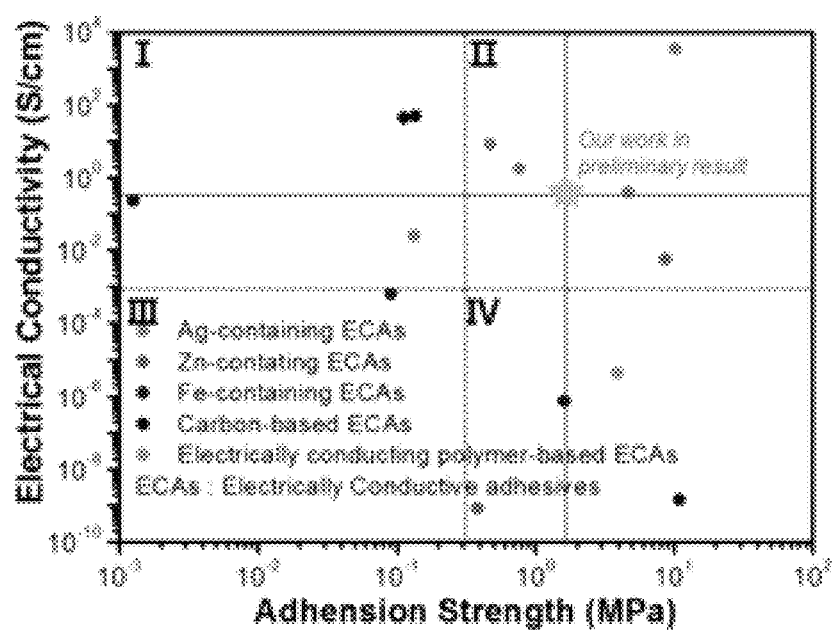
FIG. 2

ELECTRICALLY CONDUCTIVE MULTI-BLOCK POLYMERS AND METHODS OF MAKING THE SAME

CROSS-REFERENCE TO RELATED APPLICATIONS

This application claims the benefit of U.S. Provisional Application No. 62/958,001, filed Jan. 7, 2020, the content of which is incorporated herein by reference in its entirety.

FIELD

The present invention relates generally to electrically conductive multi-block polymers that can, for example, be used for adhesion and coating technology and methods for making the same. The present invention also relates to the polymer compositions that exhibit both desired conductive and adhesive properties.

BACKGROUND

Polymeric adhesives are nonmetallic materials, which possess the ability to join two surfaces by chemical and/or physical bonding. There is a large demand for electrically conductive polymers because they possess significant potential for organic electronics in charge transport, energy conversion, and energy storage. However, poor interfacial adhesion between electrically conductive polymers and other materials (and devices) is the main source of electrical energy loss, signal error, and undesirable electrical resistance.

The currently known electrically conductive adhesives possess multiple challenges. One of them is that the majority of such electrically conductive adhesives still have low adhesion and/or low conductivity (S/cm). Further, most of those electrically conductive adhesives are prepared by mixing the adhesive polymers with various conductive additives, such as, for example, heterogeneous conductive additives. However, one of the biggest concerns regarding these heterogeneous conducting additives is that solid additives are not well-compatible with an organic polymer adhesive matrix (e.g., epoxy, polyurethane, acrylate resin, novolac resin, polyacrylamide, polyvinyl alcohol, poly(styrene-block-isoprene-block-styrene), etc.). Such incompatibility can lead to a serious phase separation that occurs when the additives are blended in the polymeric adhesive matrix beyond critical levels. For example, the phase separation of silver powder in epoxypolyethersulphone can be seen in FIG. 1A. It is also known that the blending of additives can lead to severe stiffness of the blended product. Generally, more additive offers higher conductivity; however, the final polymer becomes stiff, which is not desirable for the adhesive purpose.

An additional challenge of using heterogeneous fillers to improve the conductivity of the adhesives is the presence of a rapid decay over time. As shown in FIG. 1B, a polypyrrole additive contained in polyacrylamide hydrogel, causes rapid aging that results in the color change and reduced transparency of the polymer. The aging is caused by the aggregation of nano-size additives in the polymer matrix.

The existing electrically conductive adhesives are also poorly-defined. In other words, there is no specific knowledge with regard to the polymer structure of the electrically conductive adhesives. Since most of the existing electrically conductive adhesives are prepared by blending, very little attention has been paid to the interactions between various polymer functional groups, as well as an overall structural impact on the conductivity and adhesion. Thus, there is a need for the development of well-defined electronically conducting adhesives.

Even further, there is little knowledge about the adhesion/conductivity interrelationship of the known polymers. Many recent reports blend dopamine (or catechols) to improve adhesion, but the impact of the catechol moiety on electrical conductivity has not yet been determined. Likewise, a significant knowledge gap still exists in understanding the contribution of each chemical functionality to adhesion and conducting properties.

There exists an unmet need for new polymers that have strong adhesion and high electrical conductivity. Currently, there are no efficient electronically conductive adhesives because of a large lack of scientific knowledge regarding the properties overlap of adhesives and conducting polymers. Offering strong and stable adhesion properties is a critical challenge for a new polymer.

Thus, there is still a need for novel electrically conductive adhesive polymers and methods of making the same. These needs and other needs are at least partially satisfied by the present invention.

SUMMARY

The present disclosure is generally directed to adhesive and conductive polymers. In certain aspects, disclosed herein is a multi-block polymer BCACB comprising: a) a polyanion-containing polymer segment A; b) a conjugated polymer segment B, and c) a catechol-containing polymer segment C; wherein B and C together are hard segments and wherein A is a soft segment, wherein the multi-block polymer is a linear polymer having a total molecular weight of about 50 kg/mol to about 200 kg/mol; and wherein the multi-block polymer exhibits an electrical conductivity from about 1 to about 30 S/cm and an adhesion strength of about 1 to about 30 MPa.

In further aspects, also disclosed herein is a polymer blend composition comprising: a) from greater than 0% to less than 100% of a multi-block polymer BCACB comprising: i) A is a polyanion-containing polymer segment; ii) B is a conjugated polymer segment, and iii) C is a catechol-containing polymer segment; and wherein B and C together are hard segments and wherein A is a soft segment, wherein the multi-block polymer is a linear polymer having a total molecular weight of about 50 kg/mol to about 200 kg/mol; b) from greater than 0% to less than 100% of a diblock copolymer composition of a type A'-B' co-polymer, wherein j) A'-is a polyanion-containing polymer segment; and jj) B' is a conjugated polymer segment; and wherein A' and A are the same or different, and wherein B and B' are the same or different, and wherein the polymer blend exhibits an electrical conductivity from about 1 to about 30 S/cm and exhibiting an adhesion strength of about 1 to about 30 MPa.

In still further aspects, disclosed herein is a method of making adhesive and conductive polymers. The method generally comprises: polymerizing a polyanion-containing monomer A to form a polyanion-containing polymer segment A having a first end and a second end; reacting the polyanion-containing polymer segment A with a catechol-containing monomer C, such that a first catechol-containing polymer segment C is bonded to the first end of the polyanion-containing polymer segment A and a second catechol-containing polymer segment C is bonded to the second end of the polyanion-containing polymer segment A, thereby forming a linear block CAC comprising a first terminal end and a second terminal end along a main polymer chain; and covalently bonding a monomer of a conjugated polymer B to the first and the second catechol-containing polymer segment C to form a first and a second conjugated polymer segments B, wherein the monomer of the conjugated polymer B comprises at least one alkyne functionality; thereby forming a multi-block polymer of formula BCACB, wherein B and C together are hard segments and wherein A is a soft segment; wherein the multi-block polymer of formula BCACB has a total molecular weight of about 50 kg/mol to about 200 kg/mol; and wherein the multi-block polymer exhibits an electrical conductivity from about 1 to about 30 S/cm.

In still further aspects, disclosed herein is a method of forming a blended polymer composition comprising: mixing greater than 0 wt % to less than about 100 wt % of the multi-block polymer composition prepared by the method of any one of claims 15-25 with greater than 0 wt % to less than about 100 wt % of a diblock copolymer composition of a type A'-B' co-polymer, wherein: a) A'-is polyanion-containing segment; and b) B' is a conjugated polymer segment; wherein A' and A are the same or different and wherein B' and B are the same or different; and wherein the blended polymer composition exhibits an electrical conductivity from about 1 to about 30 S/cm and an adhesion strength of about 1 to about 30 MPa.

Additional aspects of the invention will be set forth, in part, in the detailed description, figures, and claims which follow, and in part will be derived from the detailed description or can be learned by practice of the invention. It is to be understood that both the foregoing general description and the following detailed description are exemplary and explanatory only and are not restrictive of the invention as disclosed.

BRIEF DESCRIPTION OF THE FIGURES

FIGS. 1A-1B depict exemplary schematics of common issues of existing in electrically conducting adhesives that are prepared by blending of heterogeneous additives: (FIG. 1A) phase separation; (FIG. 1B) rapid aging.

FIG. 2 depicts a comparison of conductivity and adhesion strength of the exemplary multi-block polymer and known in literature polymers.

(FIG. 3A) a structure of an exemplary polymer PEDOT:poly(MDOPA-stat-SPAM); (FIG. 3B) a photograph demonstrating a conductivity of an exemplary polymer by lighting the LED light on, and (FIG. 3C) a photograph demonstrating a strong adhesion of an exemplary polymer with PET films (1.4×0.7 cm polymer layer (12 mg) is shown to held 15 lbs bowling ball).

(FIG. 4A) lap shear tensile test; and (FIG. 4B) uniaxial indentation test of a spin-coated layer of an exemplary adhesive on a soft polyurethane substrate in one embodiment.

(FIG. 5A) Four selected catechol derivatives model compounds, (FIG. 5B) 3D structures of not protected catechol (left) and TBS protected catechol (right).

DETAILED DESCRIPTION

Figures 3A, 3B, 3C:
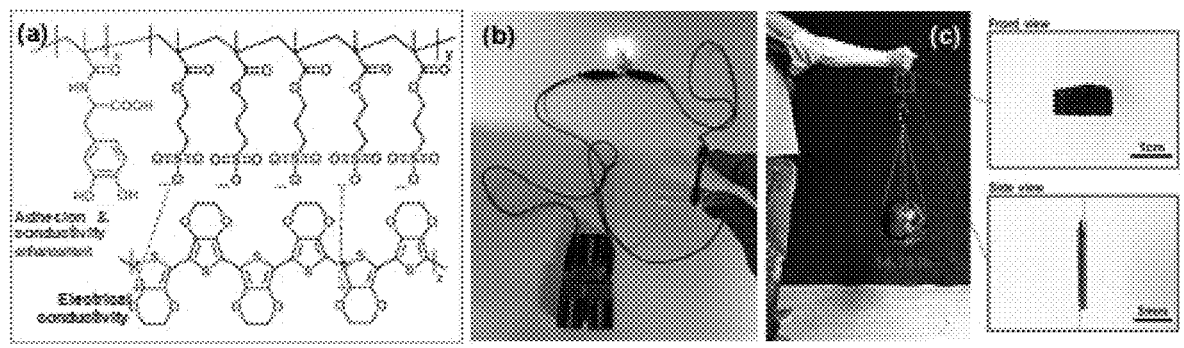
FIGS. 3A-3C depict.

The present invention can be understood more readily by reference to the following detailed description, examples, drawings, and claims, and their previous and following description. However, before the present articles, systems, and/or methods are disclosed and described, it is to be understood that this invention is not limited to the specific or exemplary aspects of articles, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein while still obtaining the beneficial results of the present invention. It will also be apparent that some of the desired benefits of the present invention can be obtained by selecting some of the features of the present invention without utilizing other features. Accordingly, those of ordinary skill in the pertinent art will recognize that many modifications and adaptations to the present invention are possible and may even be desirable in certain circumstances and are a part of the present invention. Thus, the following description is again provided as illustrative of the principles of the present invention and not in limitation thereof.

Definitions

In this specification and in the claims that follow, reference will be made to a number of terms, which shall be defined to have the following meanings:

Throughout the description and claims of this specification, the word "comprise" and other forms of the word, such as "comprising" and "comprises," means including but not limited to, and is not intended to exclude, for example, other additives, components, integers, or steps. Furthermore, it is to be understood that the terms comprise, comprising and comprises as they related to various aspects, elements and features of the disclosed invention also include the more limited aspects of "consisting essentially of" and "consisting of."

As used herein, the singular forms "a," "an," and "the" include plural referents unless the context clearly dictates otherwise. Thus, for example, reference to a "polymer" includes aspects having two or more such polymers unless the context clearly indicates otherwise.

Ranges can be expressed herein as from "about" one particular value and/or to "about" another particular value. When such a range is expressed, another aspect includes from the one particular value and/or to the other particular value. Similarly, when values are expressed as approximations, by use of the antecedent "about," it will be understood that the particular value forms another aspect. It should be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

For the terms "for example" and "such as," and grammatical equivalences thereof, the phrase "and without limitation" is understood to follow unless explicitly stated otherwise.

As used herein, the term "substantially" can in some aspects refer to at least about 80%, at least about 85%, at least about 90%, at least about 91%, at least about 92%, at least about 93%, at least about 94%, at least about 95%, at least about 96%, at least about 97%, at least about 98%, at least about 99%, or about 100% of the stated property, component, composition, or other condition for which substantially is used to characterize or otherwise quantify an amount.

In other aspects, as used herein, the term "substantially free," when used in the context of a composition or component of a composition that is substantially absent, is intended to refer to an amount that is less than about 1% by weight, e.g., less than about 0.5% by weight, less than about 0.1% by weight, less than about 0.05% by weight, or less than about 0.01% by weight of the stated material, based on the total weight of the composition.

References in the specification and concluding claims to parts by weight of a particular element or component in a composition or article, denotes the weight relationship between the element or component and any other elements or components in the composition or article for which a part by weight is expressed. Thus, in a composition or a selected portion of a composition containing 2 parts by weight of component X and 5 parts by weight component Y, X and Y are present at a weight ratio of 2:5, and are present in such ratio regardless of whether additional components are contained in the composition.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, 6 and any whole and partial increments therebetween. This applies regardless of the breadth of the range.

As used herein, the term "composition" is intended to encompass a product comprising the specified ingredients in the specified amounts, as well as any product which results, directly or indirectly, from a combination of the specified ingredients in the specified amounts.

A weight percent of a component, unless specifically stated to the contrary, is based on the total weight of the formulation or composition in which the component is included.

As used herein, the term "glass transition temperature" or "Tg" means the temperature at which an amorphous material changes from a brittle, vitreous state to a plastic state. It is dependent upon the composition of the material being tested, including moisture content, the extent of annealing, and the pressure exerted on the material. Glass transition temperature may be measured by differential scanning calorimetry, thermomechanical analysis, dynamic mechanical analysis, and the like.

The multi-block polymers of the current invention are defined to have both hard and soft segments. As used herein, the term "hard segment" refers to the polymeric segments that can donate/accept hydrogen bonds. The hard segments are expected to contribute to the strength and rigidity of the block polymer. In certain aspects, the hard segments can provide strength and rigidity through the presence of crosslinked bonds. As used herein, the term "soft segment" refers to the polymeric segments that cannot donate/accept hydrogen bonds. The soft segments are expected to provide for the elasticity of the block polymer.

As used herein, the term "Atom Transfer Radical Polymerization (ATRP) reaction" refers to a reaction resulting in forming a carbon-carbon bond with a transition metal catalyst. In an ATRP process, the dormant species is activated by the catalyst to generate radicals via the one-electron transfer process. The number of polymer chains is determined by the number of initiators. Each growing chain has the same probability of propagating with monomers to form living/dormant polymer chains ($R-P_n-X$). As a result, polymers with similar molecular weights and narrow molecular weight distribution can be prepared.

Also described herein are "click reactions." "Click reactions" or "click chemistry" are the terms that describe reactions giving high yield and selectivity products by carbon-hetero bond formation reactions. The exemplary click reactions used in the disclosed methods are called the alkyne-azide or diene-dienophile click reactions. It is understood that the name of this click reaction is due to the functional groups involved in forming the covalent bond.

As used herein, the term "catalyst-transfer polymerization (CTP)" refers to a living chain-growth polymerization that is used for synthesizing conjugated polymers. It is understood that the use of the CTP results in lower polydispersity of the polymer and provides for greater control over the number average molecular weight in the resulting polymer.

As used herein, the term "conjugated polymer" refers to polymers that are characterized by a backbone chain of alternating double- and single bonds. In the conjugating polymers, the overlapping p-orbitals create a system of delocalized electrons.

As used herein, the term "oxidative polymerization" refers to a reaction where abstraction of two hydrogen atoms from a monomer forms a polymer. In certain aspects, oxidative polymerization also can be classified as a polycondensation reaction.

Methods of Making Multi-Block Polymers

It is understood, and as described herein, electrically conductive adhesives of this description refer to polymers that possess features of both polymeric adhesives and electrically conducting polymers. It is understood that the "electrically conductive adhesive polymers" do not represent an independent class of polymers and are usually described by the combination of adhesive and conductive properties in a single polymer. A few common features can be found in the existing literature on electrically conductive adhesives. One of the common features is flexibility, which is an important requirement of general polymeric adhesives. The high flexibility generates fast adhesion and large-area contact between surfaces by rapid deformation of the polymer matrix. Due to the relationship between viscoelasticity and adhesion, it is commonly asserted that the stretchable conductive polymers have an "adhesion" feature as a part of many listed properties simply because the polymer is flexible, even though the polymer is not designed as an adhesive.

Another common feature found in the existing literature on electrically conductive adhesives relates to interfacial adhesion. The key to interfacial adhesion is fast and durable bond formation by wetting the surface efficiently. In addition to interfacial adhesion, cohesion can also be very important because cohesion relates to the resistance to the bond-separation process of adhesion. Cohesion can be controlled by crosslinking within the polymer matrix. However, cohesion is overlooked in the literature and has not been systematically studied. The current disclosure, in certain aspects, is directed to methods of making conductive adhesive polymers with controlled crosslinking that can affect cohesion.

An additional common feature is directed to defining external component(s) to facilitate electrical conductivity. Since conventional polymeric adhesives are electrical insulators, most of the existing electrically conductive adhesives include conductive fillers, such as metal powder (silver, nickel, copper, etc.), carbon-based compounds (graphene oxide, carbon nanotubes, carbon black, etc.), and intrinsically conducting polymers (conjugated polymers).

Those conductive fillers are added to conventional polymeric adhesives as heterogeneous particles to provide electronic conductivity. The blending of heterogeneous filler leads to many drawbacks, including severe phase separation, deterioration of mechanical properties, and a shortened lifetime of the material.

FIG. 2 shows a comparison of different electronically conducting adhesives in terms of electrical conductivity and adhesion strength from the literature. The top right quadrant of FIG. 2 shows the most desirable polymers that have both high adhesion and conductivity. Although there are a few polymers in the top right quadrant, they are known to be costly and relatively poor conductors per unit mass of material (i.e., the additive containing polymer is too heavy). FIG. 2 also depicts an exemplary polymer disclosed herein and obtained by the previously disclosed methods.

Electrically conductive polymers possess significant potential for organic electronics in charge transport, energy conversion, and energy storage. The conducting polymer commonly shows a molecular structure of alternating single (σ) and double (π) bonds. This conjugated molecular structure allows electrons to be easily delocalized along the polymer chain, and therefore, electrons can move freely between atoms with the addition of doping agents. Commonly used modern conducting polymers are polythiophene, polypyrrole, polyaniline, and other conjugated polymers. The current disclosure, in one aspect, shows a novel approach of forming well-defined multi-block polymers with self-doped conducting polymer segments to achieve both high adhesion and conductivity as well as a precise understanding of a functional group's effect on properties.

Multi-block polymeric adhesives are known to have strong pressure-sensitive adhesive properties and form unique nanosized morphological structures via spontaneous self-assembly. Pressure-sensitive adhesives are known to bind to universal types of surfaces under very small degrees of pressure (e.g., Scotch tape and Post-It™ notes). The most commonly used multi-block polymeric adhesives are tri-block copolymers that have hard segments on both terminals and soft segments in the middle segment of a linear polymer. This A-B-A type triblock copolymer is a thermoplastic elastomer that behaves as an elastomer without chemical crosslinking. Physical crosslinking occurs in the thermoplastic elastomer as a form of crosslinking rather than covalent bond crosslinking. The physical crosslinks hold a flexible matrix in the overall 3D structure of the polymer. Typically, as a result of spontaneous self-assembly, a hard domain can be formed. The hard domain is a physical crosslinking point. The thermoplastic elastomer is easily re-processable because the formation of physical crosslinking (hard domain) is reversible. The thermoplasticity of multi-block polymers provides significant advantages in adhesive processing.

The multi-block polymer is a suitable polymer architecture to covalently combine multiple distinctive functions into a linear polymer. This disclosure, in certain aspects, is directed to multi-block polymers that can satisfy both pressure-sensitive adhesives and conducting polymers requirements. In still further aspects, the disclosed polymer can overcome the disadvantages of commonly known conducting adhesives. In still further aspects, the disclosed polymer can overcome issues associated with heterogeneous additive blending, poorly defined structure, no study on adhesion/conductivity interrelationship, and poor adhesion/conductivity with a single multifunctional polymer synthesis.

In certain aspects, the functional groups can comprise poly(3,4-ethylenedioxythiophene) polystyrene sulfonate (PEDOT), poly(3-sulfopropyl methacrylate) (polySPM), and catechol containing DOPA moiety (poly(N-methacryloyl-3,4-dihydroxyl-L-phenylalanine, polyMDOPA) as shown in FIG. 3A In such exemplary aspects, the polymer, as it is schematically shown in FIG. 3A, can be prepared by the synthesis of poly(MDOPA-stat-SPM) followed by polymerization of EDOT in the presence of poly(MDOPA-stat-SPM) solution. The poly(MDOPA-stat-SPM) has shown high conductivity (2.5 S/cm), waterborne-adhesion (1.62 MPa), flexibility, transparency (92% transmittance at Vis range), lightweight, and biocompatibility (on human embryonic kidney (HEK) cell lines). In still further aspects, the poly(MDOPA-stat-SPM) does not comprise any metallic powder. However, the poly(MDOPA-stat-SPM) is a statistical copolymer, not a block copolymer. Without wishing to be bound by any theory, it was hypothesized that the block copolymer could exhibit even better electrical conductivity and adhesive properties when it is compared to the statistical copolymer.

It is understood that in order to attain strong adhesion, bond-forming (interfacial adhesion) must be fast, and there must be strong resistance to bond-separation (cohesion). During the bond formation, adhesive polymer chains should be flexible for fast contact with the substrate surface. In other words, the adhesive polymer should wet the substrate surface quickly.

As summarized above, disclosed herein is a method comprising: polymerizing a polyanion-containing monomer A to form a polyanion-containing polymer segment A having a first end and a second end; reacting the polyanion-containing polymer segment A with a catechol-containing monomer C, such that a first catechol-containing polymer segment C is bonded to the first end of the polyanion-containing polymer segment A and a second catechol-containing polymer segment C is bonded to the second end of the polyanion-containing polymer segment A, thereby forming a linear block CAC comprising a first terminal end and a second terminal end along a main polymer chain; and covalently bonding a monomer of a conjugated polymer B to the first and the second catechol-containing polymer segment C to form a first and a second conjugated polymer segments B; thereby forming a multi-block polymer of formula BCACB, wherein B and C together are hard segments and wherein A is a soft segment.

In still further aspects, disclosed herein is the method of making the multi-block polymer of formula BCACB, wherein the polyanion-containing monomer A comprises a methacrylate-containing anionic monomer or a saturated fatty acid derivative. In still further aspects, the polyanion-containing monomer A can comprise a 3-sulfopropyl methacrylate (SPM), a sulfoethyl methacrylate, or a combination thereof.

In yet other aspects, the saturated fatty acid derivative can comprise a 12-(methacryloyloxy) dodecanoic acid. It is hypothesized that since the 12-(methacryloyloxy) dodecanoic acid is naturally flexible due to the long aliphatic chain between the anionic pendant group (carboxylic acid groups and polymer backbone, the multi-block polymer having it as a soft segment can exhibit desirable adhesive properties. In still further aspects, the long alkyl chain spacer of the 12-(methacryloyloxy) dodecanoic acid can reduce hydrophilicity of the formed multi-block polymer and help develop solvent-free hydrophobic conducting adhesives/coating agents.

In still further aspects, disclosed herein, the step of polymerizing the polyanion-containing monomer A to form the polyanion-containing polymer segment A can be performed by any methods known in the art. In still further aspects, the step of polymerizing the polyanion-containing monomer A to form the polyanion-containing polymer segment A can comprise an atom transfer radical polymerization (ATRP) of the polyanion-containing monomer. In certain aspects, the ATRP reaction can be performed in the presence of a metal-based catalyst. In still further aspects, the ATRP reaction can be a metal-free photoredox atom transfer radical polymerization reaction. In aspects where the metal-based catalyst is employed, such a catalyst can comprise, for example, and without limitation, complexes of Cu, Fe, Ru, Ni, and Os. In aspects where the ATRP is a metal-free photoredox atom transfer radical polymerization reaction, it can be catalyzed by various photosensitive compounds, for example, and without limitation by Eosin Y.

In such aspects, the ATRP reaction is conducted in the presence of a first ATRP initiator. In yet other aspects, the first ATRP initiator can comprise a first alkyl halide initiator comprising one or more halogen atoms. In still further aspects, the first ATRP initiator can comprise, for example, and without limitation, 1-phenylethyl bromide, methyl 2-bromopropionate, 2-bromopropionitrile, ethyl 2-bromoisobutyrate, ethyl 2-bromopropionate, 1-phenyl ethylbromide, tosyl chloride, 1-cyano-1-methylethyldiethyldithiocarbamate, 2-(N, N-diethyldithiocarbamyl)-isobutyric acid ethyl ester, dimethyl 2,6-dibromoheptanedioate, ethane-1,2-diyl bis(2-bromo-2-methylpropanoate), and the like.

In certain exemplary aspects, the step of polymerizing the polyanion-containing monomer A to form the polyanion-containing polymer segment A can be done according to an exemplary Scheme 1:

Scheme 1

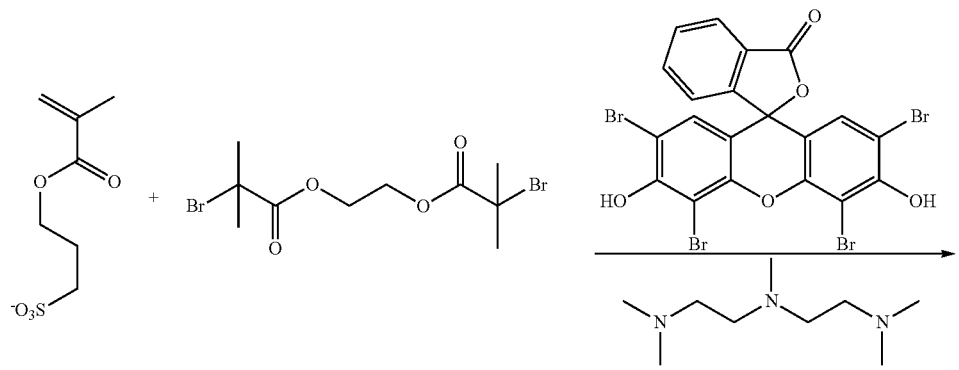

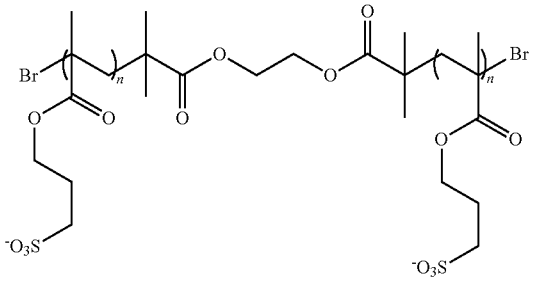

In this exemplary synthesis scheme, the Eosin Y

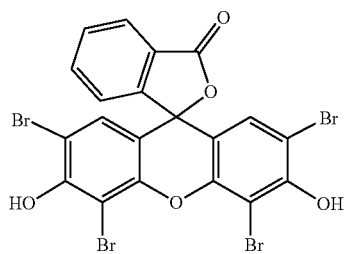 [SMILES: O=C1OC2(c3ccccc31)c1cc(Br)c(O)c(Br)c1Oc1c2cc(Br)c(O)c1Br]

can be used as a catalyst, and pentamethyldiethylenetriamine (PMDETA)

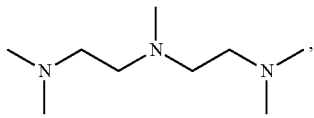

as an electron donor to facilitate the polymerization reaction. In such exemplary aspects, the polymerization reaction is facilitated with visible light irradiation.

In certain aspects, the first ATRP reaction can be conducted at conditions comprising any conditions effective to provide the desired product. In still further aspects, the length and molecular weight of the formed polyanion-containing polymer segment A can be controlled by the catalyst concentration, the electron donor concentration and can be further regulated by switching on and of the light irradiation.

In still further aspects, the polyanion containing segment can be chosen depending on the specific application, the desired glass transition temperature, adhesive properties, etc. In some exemplary aspects, long-chain saturated carboxylic acids can be used. In still further exemplary aspects, the polyanion-12-(methacryloyloxy) dodecanoic acid can be prepared according to an exemplary Scheme 2:

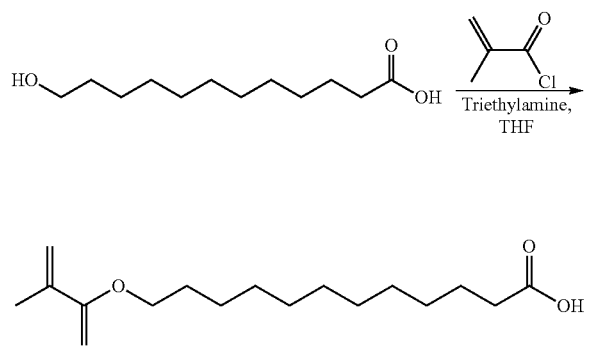

In still further aspects, the formed polyanion-containing polymer segment A has a molecular weight from greater than 0 kg/mol to less than 200 kg/mol. In the aspects wherein the formed polyanion-containing polymer segment A comprises a derivative of the saturated carboxylic acid, the segment A has a molecular weight from greater than 0 kg/mol to less than 200 kg/mol.

In still further aspects, the polyanion-containing segment A has a glass transition temperature ($T_g$) from about $-75°$ C. to about $-15°$ C., including exemplary values of about $-70°$ C., about $-65°$ C., about $-60°$ C., about $-55°$ C., about $-50°$ C., about $-45°$ C., about $-40°$ C., about $-35°$ C., about $-30°$ C., about $-25°$ C., and about $-20°$ C. In still further aspects, the polyanion-containing segment A can have a glass transition temperature having any value between any two foregoing values.

In still further aspects, the catechol-containing monomer C can comprise an N-methacryloyl-3,4-dihydroxyl-L-phenylalanine (MDOPA). In still further aspects, the catechol-containing monomer C is MDOPA. Catechol is a main structural component in DOPA, a modified amino acid found in marine organisms such as mussels and sandcastle worms. The catechol in DOPA is the essential contributor to the strong adhesion properties of plaque proteins. However, catechol alone does not always strengthen the adhesion properties of all polymers. The catechol functionality can be integrated within well-defined polymers that possess optimum viscoelastic properties, cohesion bond formation (crosslinking) properties, and mechanical strength. Without wishing to bound by any theory, it is hypothesized that the reaction of the polyanion-containing polymer segment A with the catechol-containing monomer C to form the soft segment A bonded with the catechol containing segment has a critical role in providing strong adhesion.

In still further aspects, the catechol containing monomer C reacts with each end of the polyanion-containing polymer segment A to form a catechol-containing polymer segment C on both ends of the polyanion-containing segment A, and thereby forming a linear block CAC comprising a first terminal end and a second terminal end along a main polymer chain.

In certain aspects, the step of reacting the polyanion-containing polymer segment A with the catechol containing monomer C can be done by any methods known in the art. In yet other aspects, the step of reacting comprises an atom transfer radical polymerization (ATRP) of the polyanion-containing polymer segment A with the catechol-containing monomer C in the presence of a second ATRP initiator. In still further aspects, the second ATRP initiator comprises a second alkyl halide initiator comprising one or more halogen atoms. In certain aspects, the first and the second terminal ends along a main polymer of the linear block CAC formed as a result of the second ATRP reaction can comprise a halide atom.

In still further aspects, the second ATRP initiator can comprise, for example, and without limitation, 1-phenylethyl bromide, methyl 2-bromopropionate, 2-bromopropionitrile, ethyl 2-bromoisobutyrate, ethyl 2-bromopropionate, 1-phenyl ethylbromide, tosyl chloride, 1-cyano-1-methylethyl diethyldithiocarbamate, 2-(N, N-diethyldithiocarbamyl)-isobutyric acid ethyl ester, dimethyl 2,6-dibromoheptanedioate, ethane-1,2-diyl bis (2bromo-2methylpropanoate). In yet other aspects, the first and the second ATRP are the same or different.

In still further aspects, the step of reacting can be performed accordingly to an exemplary reaction Scheme 3:
Scheme 3
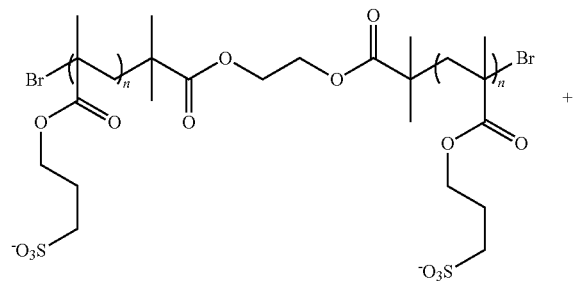
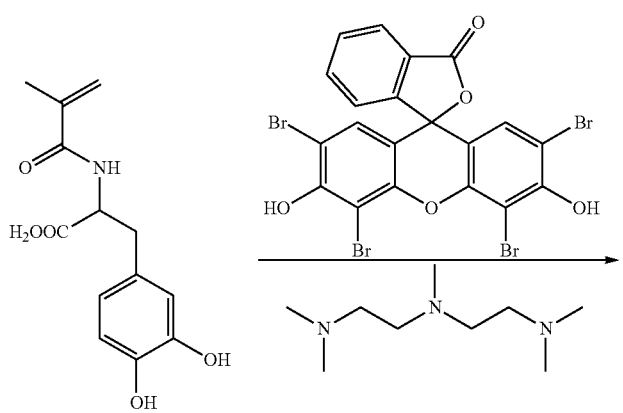
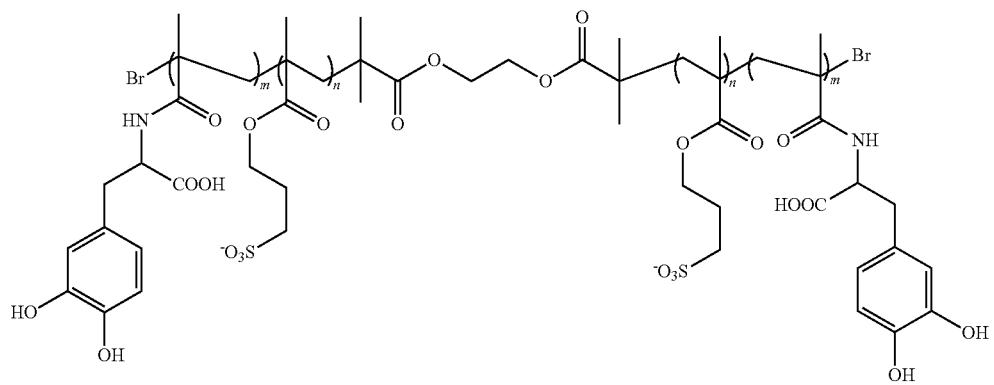

In certain aspects, a catechol functional group can be protected from an undesirable side reaction by reacting a catechol functionality of the catechol-containing monomer C with a protective group before the step of reacting the polyanion-containing polymer segment A with the catechol-containing monomer C. In such exemplary aspects, the step of reacting the polyanion-containing polymer segment A with a protected catechol-containing monomer C can be done according to an exemplary Scheme 4:

Scheme 4

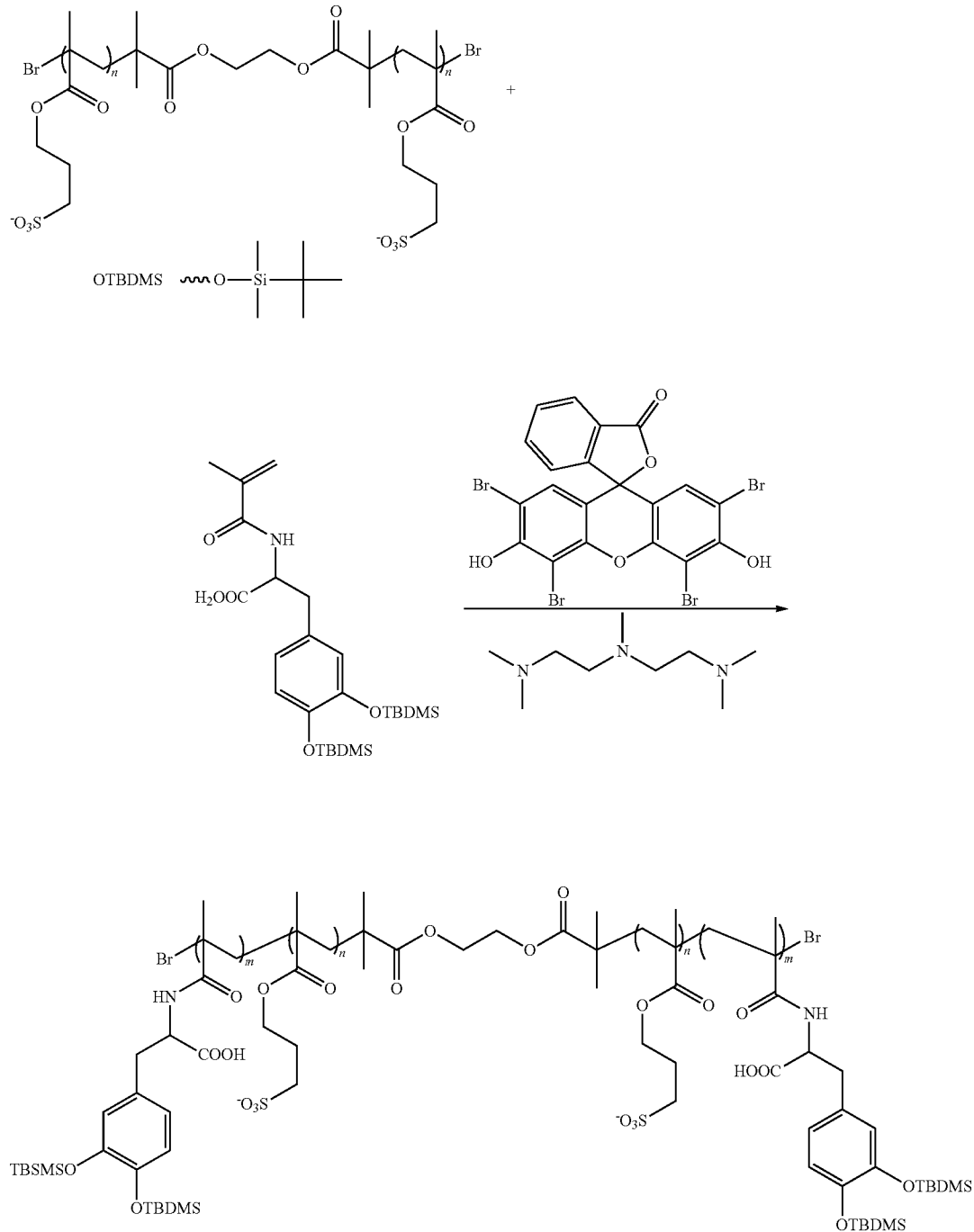

In yet other aspects, a catechol functional group of each of the catechol-containing segments C in the linear CAC block can be reacted with a protective group before the step of covalently bonding. In still further aspects, the protective group can comprise any functional groups that can tempo-
rarily react with the hydroxyl groups of the catechol containing segment or the monomer and can be easily removed when no additional protection is needed. In some aspects, the protective group can comprise an oxygen protective group comprising a trimethylsilyl group (TMS), a triethylsilyl group (TES), a t-butyldimethylsilyl group (TBS or TBDMS), a triisopropyl group (TIPS), or a t-butyldiphenylsilyl group (TBDPS). In still further aspects, the protective group can be removed by any known in the art methods. For example, and without limitation, the protective groups can be removed by reacting it with, for example, t multi-n-butylammonium fluoride (TBAF). In still further aspects, it is understood that the protective group can be removed at any process step disclosed herein. In certain aspects, the protective group can be removed before the step of covalently bonding a monomer of a conjugated polymer B to the first and the second catechol-containing polymer segment C to form a first and a second conjugated polymer segment B. In yet other aspects, the protective group can be removed after the step of covalently bonding a monomer of a conjugated polymer B to the first and the second catechol-containing polymer segment C to form a first and a second conjugated polymer segment B.

In yet further aspects, the catechol-containing segment C has a molecular weight greater than 0 kg/mol to less than 200 kg/mol.

In still further aspects, the disclosed method further comprises a step of converting each of the halide terminal ends of the linear block CAC to an azido functionalized terminal end and wherein the step of converting occurs before the step of covalently bonding. In still further aspects, the step of converting the halide terminal ends can be done according to an exemplary Scheme 5:

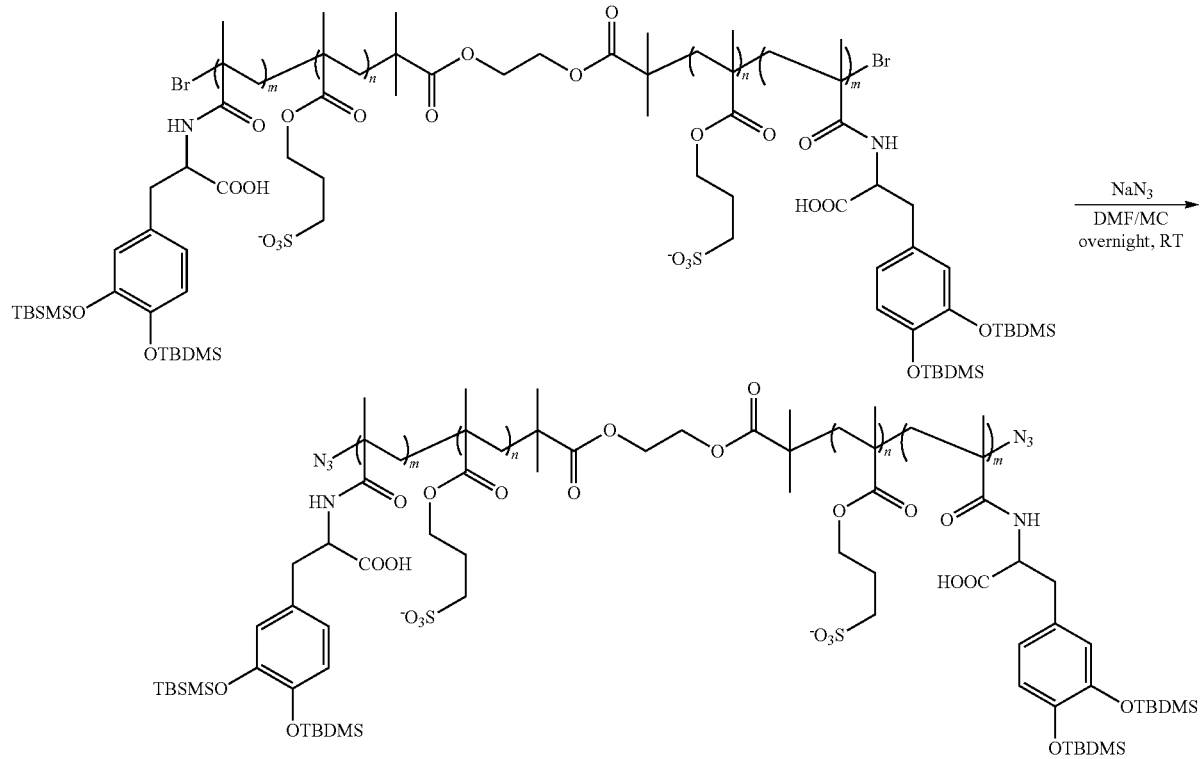

Scheme 5

It is understood that in some aspects, and as shown in the exemplary Scheme 5, the catechol containing functionalities can be protected with the protecting groups. However, in yet other aspects, the catechol containing functionalities are not protected with the protecting group during the step of converting the halide terminal ends to azido functionalized terminal ends.

In still further aspects, the monomer of the conjugated polymer B can comprise a substituted or unsubstituted polythiophene, poly(3-alkylthiophenes), polypyrrole, poly (isothianaphthene), poly(3,4-ethylenedioxythiophene), alkoxy-substituted polyp-phenylene vinylene), poly(2,5-bis (cholestanoxy)phenylene vinylene, poly(p-phenylene vinylene), poly(2,5-dialkoxy)paraphenylene vinylene, poly [(1,4-phenylene-1,2-diphenylvinylene)], poly(3',7'-dimethyloctyloxy phenylene vinylene, polyparaphenylene, ladder-type polyparaphenylene, polyparaphenylene sulphide, polyheptadiyne, poly(3-hexylthiophene), poly(3-octylthiophene), poly(3-cyclohexylthiophene), poly(3-methyl-4-cyclohexylthiophene), polyaniline, poly(2,5-dialkoxy-1,4-phenyleneethynylene), poly(3-octylthiophene), poly(2-decyloxy-1,4-phenylene), poly(9,9-dioctylflorene), thiopheneethylamine, or polyquinoline. In still further aspects, the monomer of the conjugated polymer B comprises a substituted or unsubstituted polythiophene, polypyrrole, or polyaniline. In yet further aspects, the monomer of the conjugated polymer B comprises substituted or unsubstituted polythiophene. In still further aspects, the monomer of the conjugated polymer B can comprise a 3,4-ethylenedioxythiophene (EDOT) monomer.

In still further aspects, the substituted polythiophenes can be used to form the monomer of the conjugated polymer B. In yet other aspects, the substitution can occur at any position of the thiophene monomer. In yet other aspects, the substitution can occur at the 3-position of the thiophene monomer. In still further aspects, any known in the art substituents can be utilized. In certain aspects, the substituents can comprise alkyl, alkenyl, or alkynyl groups. In still further aspects, these substituents can also be optionally substituted.

It is understood that in some aspects, the length of the conjugated polymer can be strictly controlled. In such exemplary aspects, the polymerization reaction can be terminated when a desirable polymer length or mass is obtained.

In yet further aspects, the conjugated polymer segment B has a molecular weight from greater than 0 kg/mol to less than 200 kg/mol. In still further aspects, the conjugated polymer B can have any degree of polymerization that is suitable for the desired applications. In some aspects, the degree of polymerization can be from about 15 to about 150, including the exemplary value of about 20, about 30, about 40, about 50, about 60, about 70, about 80, about 90, about 100, about 110, about 120, about 130, and about 140. In yet other aspects, the degree of polymerization can have any value between any two foregoing values.

In still further aspects, the monomer of the conjugated polymer B can be prepared by any known in the art methods. In still some aspects, the monomer of the conjugated polymer B can be prepared by a catalyst transfer polymerization. In certain aspects, any known catalyst can be used. In some exemplary and non-limiting aspects, an exemplary polythiophene segment can be synthesized by a Ni-catalyzed cross-coupling polymerization or a catalyst transfer polymerization according to an exemplary Scheme 6.

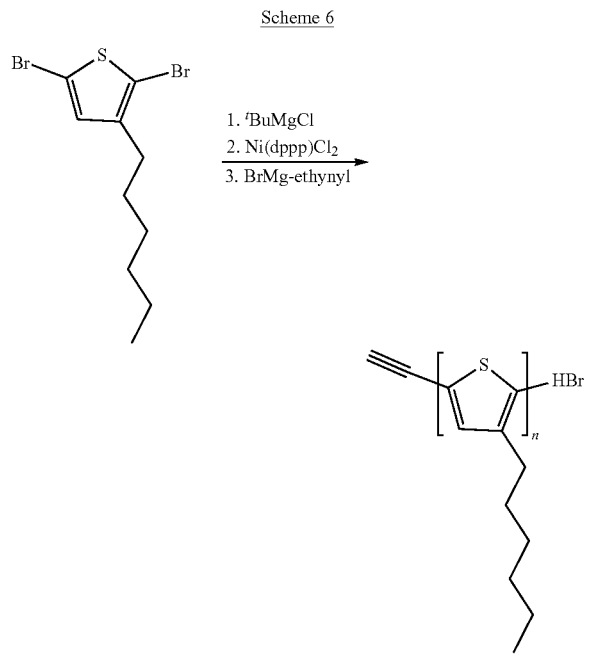

Scheme 6

In yet other aspects, the monomer of the conjugated polymer B can comprise an alkyne functionality, as shown in Scheme 6.

In still further aspects, the step of bonding the conjugated polymer B with the linear block CAC comprises a step of covalently bonding an alkyne functionalized conjugated polymer B with the azido terminal ends of the linear block CAC. In still further aspects, the step of covalently bonding comprises an alkyne-azide click reaction between the monomer of the conjugated polymer B and the azido terminal ends of the linear block CAC. In some exemplary aspects, such a click reaction can be performed according to an exemplary Scheme 7:

Scheme 7

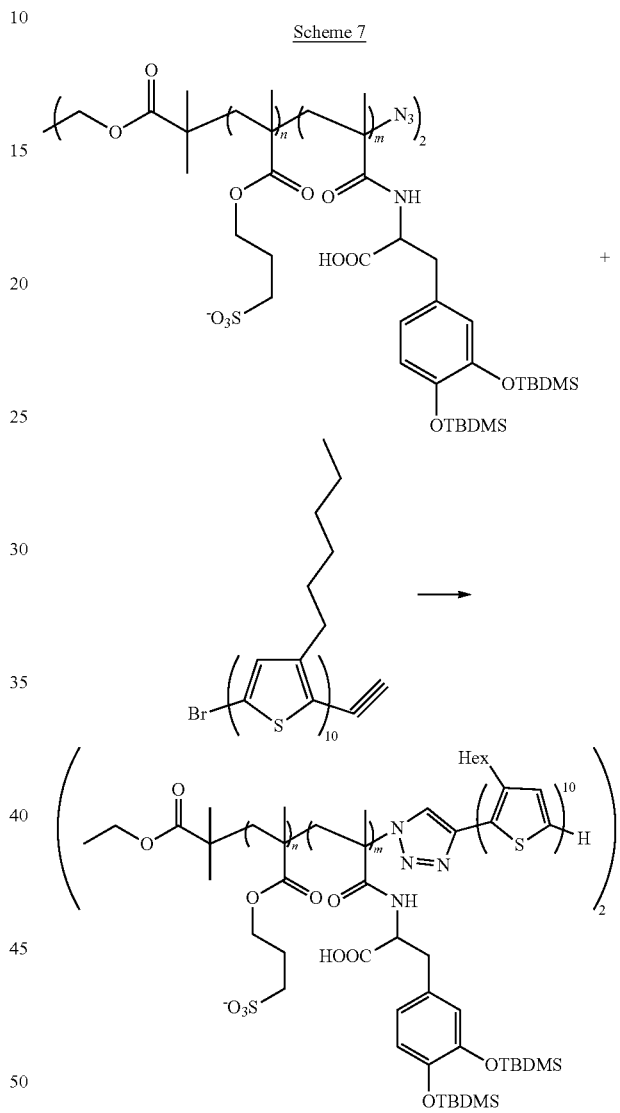

It is understood that in some aspects, and as shown in the exemplary Scheme 7, the catechol containing functionalities can be protected with the protecting groups. However, in yet other aspects, the catechol containing functionalities are not protected with the protecting group during the step of covalent bonding.

In still further exemplary and non-limiting aspects, the monomer of the conjugated polymer B can comprise 4-ethylenedioxythiophene (EDOT). In such exemplary and non-limiting aspects, the step of covalently bonding comprises oxidative polymerization of the 3,4-ethylenedioxythiophene (EDOT) to form a poly(3,4-ethylenedioxythiophene) (PEDOT) segment on the first and the second terminal ends of the linear block CAC. In such exemplary aspects, the step of covalent bonding can be performed according to an exemplary Scheme 8:

Scheme 8

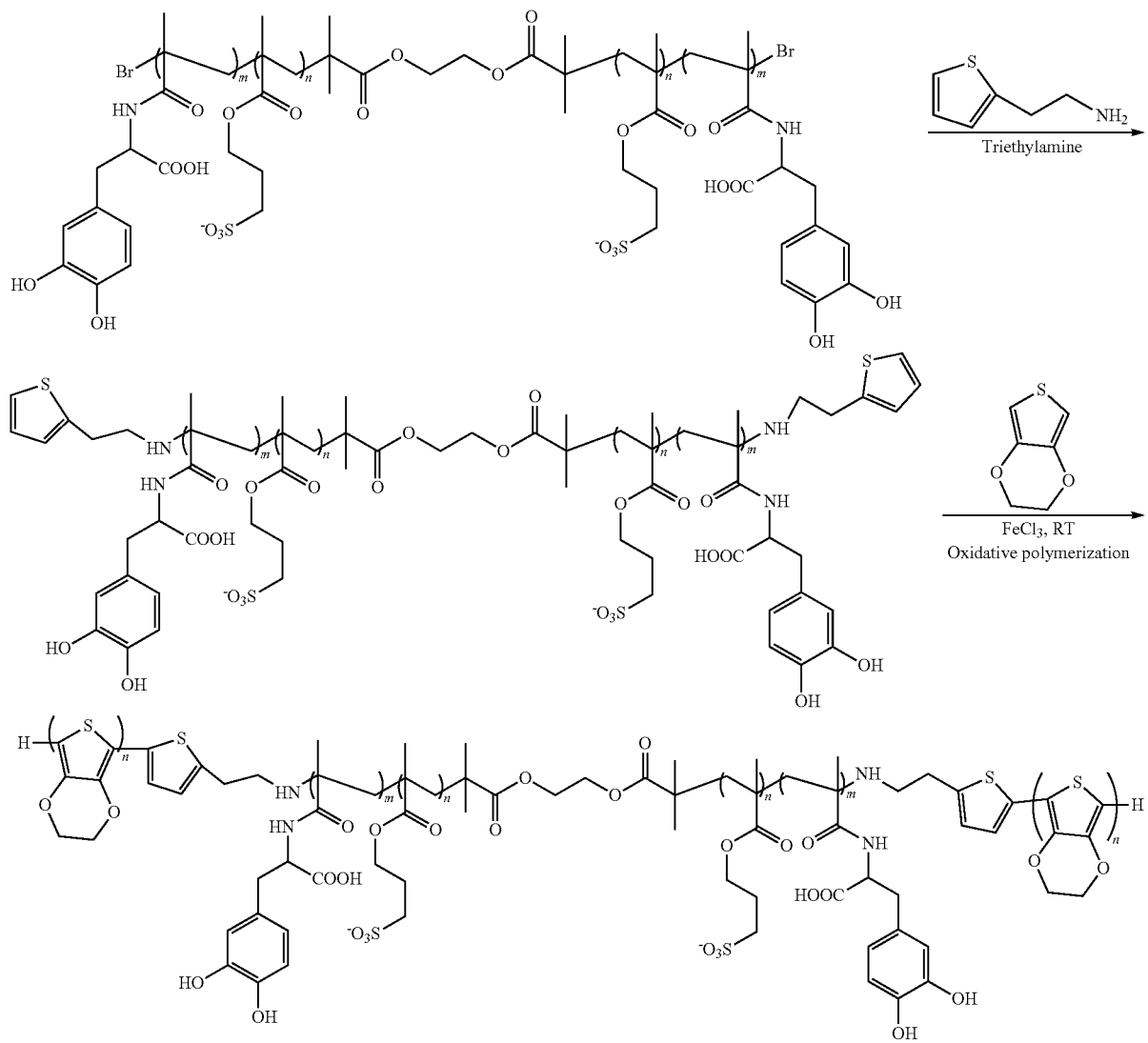

In still further aspects, the formed multi-block polymer BCACB can have any desired molecular weight for a specific application. In certain aspects, the molecular weight of BCACB is from about 50 kg/mol to about 250 kg/mol, including exemplary values of about 75 kg/mol, about 100 kg/mol, about 125 kg/mol, about 150 kg/mol, about 175 kg/mol, about 200 kg/mol, and about 225 kg/mol. In still further aspects, it is understood that the molecular weight of the multi-block polymer can have any value between any two foregoing values.

In still further aspects, the multi-block polymer formed by the disclosed methods can exhibit an electrical conductivity from about 1 S/cm to about 30 S/cm, including exemplary values of about 2 S/cm, about 5 S/cm, about 8 S/cm, about 10 S/cm, about 12 S/cm, about 15 S/cm, about 18 S/cm, about 20 S/cm, about 22 S/cm, about 25 S/cm, and about 28 S/cm. It is understood that the multi-block polymer can exhibit an electrical conductivity having any value between any two foregoing values.

In still further aspects, the multi-block polymer formed by the disclosed methods can exhibit an adhesion strength from about 1 MPa to about 30 MPa, including exemplary values of about 2 MPa, about 5 MPa, about 8 MPa, about 10 MPa, about 12 MPa, about 15 MPa, about 18 MPa, about 20 MPa, about 22 MPa, about 25 MPa, and about 28 MPa. It is understood that the multi-block polymer can exhibit an adhesion strength having any value between any two foregoing values.

Methods of Making Polymer Blends

In still further aspects, disclosed herein is a method of forming a blended polymer composition comprising: mixing an amount of the multi-block polymer BCACB prepared by disclosed methods with an amount of a diblock copolymer composition of a type A'-B' co-polymer, wherein: a) A'-is polyanion-containing segment; and b) B' is a conjugated polymer segment; wherein A' and A are the same or different and wherein B' and B are the same or different.

In still further aspects, the multi-block polymer BCACB prepared by disclosed methods is provided in an amount from greater than 0 to less than 100% of the blend. In yet further aspects, the diblock copolymer composition of the type A'-B' is provided in an amount from greater than 0 to less than 100% of the blend, including exemplary values.

In still further aspects, the polyanion-containing segment A' can comprise any of the polyanion-containing segments A disclosed herein. In still further aspects, the polyanion-containing segment A' can be the same or different as the polyanion-containing segment A. In yet other aspects, the polyanion-containing polymer segment A' of the diblock copolymer composition is substantially similar to the polyanion-containing polymer segment A of the multi-block polymer prepared by the disclosed methods.

In still further aspects, the polyanion-containing segment A' can have any desired molecular weight.

In still further aspects, the conjugated polymer segment B' can comprise any of the conjugated polymer segments B disclosed herein. In still further aspects, the conjugated polymer segment B' can be the same or different as the conjugated polymer segment B. In yet other aspects, the conjugated polymer segment B' of the diblock copolymer composition is substantially similar to conjugated polymer segment B of the multi-block polymer prepared by the disclosed methods.

In still further aspects, the conjugated polymer segment B' can have any desired molecular weight.

In still further aspects, the blended polymer composition can exhibit an electrical conductivity from about 1 S/cm to about 30 S/cm, including exemplary values of about 2 S/cm, about 5 S/cm, about 8 S/cm, about 10 S/cm, about 12 S/cm, about 15 S/cm, about 18 S/cm, about 20 S/cm, about 22 S/cm, about 25 S/cm, and about 28 S/cm. It is understood that the blended polymer composition can exhibit an electrical conductivity having any value between any two foregoing values.

In still further aspects, the blended polymer composition can exhibit an adhesion strength from about 1 MPa to about 30 MPa, including exemplary values of about 2 MPa, about 5 MPa, about 8 MPa, about 10 MPa, about 12 MPa, about 15 MPa, about 18 MPa, about 20 MPa, about 22 MPa, about 25 MPa, and about 28 MPa. It is understood that the blended polymer composition can exhibit an adhesion strength having any value between any two foregoing values.

In still further aspects, the mixing of the multi-block polymer BCACB with the diblock copolymer A'-B' can be done by any known methods in the art.

Conductive Adhesive Polymers

As summarized above, disclosed herein are conductive adhesive polymers. In yet other aspects, the disclosed conductive adhesive polymers comprise multi-block polymers. In still further aspects, the multi-block comprises a multi-block polymer.

In certain aspects, disclosed herein is a multi-block polymer BCACB comprising: a) a polyanion-containing polymer segment A; b) a conjugated polymer segment B, and c) C is a catechol-containing polymer segment C; wherein B and C together are hard segments and wherein A is a soft segment.

In still further aspects, disclosed herein is a multi-block polymer having a structure of BCABC and comprising: a) a polyanion-containing polymer segment A; b) a conjugated polymer segment B, and c) C is a catechol-containing polymer segment C; wherein B and C together are hard segments and wherein A is a soft segment.

In still further aspects, disclosed herein is a multi-block polymer having a structure of CBACB and comprising: a) a polyanion-containing polymer segment A; b) a conjugated polymer segment B, and c) C is a catechol-containing polymer segment C; wherein B and C together are hard segments and wherein A is a soft segment.

In yet other aspects, disclosed herein is a multi-block polymer having a structure of $[BC]_xA[BC]_y$ and comprising: a) a polyanion-containing polymer segment A; b) a conjugated polymer segment B, and c) C is a catechol-containing polymer segment C; wherein B and C together are hard segments and wherein A is a soft segment, wherein x and y are integral numbers and are the same or different.

In yet other aspects, disclosed herein is a multi-block polymer having a structure of $[[BC]_xA]_yBC$ and comprising: a) a polyanion-containing polymer segment A; b) a conjugated polymer segment B, and c) C is a catechol-containing polymer segment C; wherein B and C together are hard segments and wherein A is a soft segment, wherein x and y are integral numbers and are the same or different.

In still further aspects, disclosed herein are multi-block polymers of formula BCACB having a linear structure. In still further aspects, the multi-block polymer has a linear structure and a molecular weight of about 50 kg/mol to about 250 kg/mol, including exemplary values of about 75 kg/mol, about 100 kg/mol, about 125 kg/mol, about 150 kg/mol, about 175 kg/mol, about 200 kg/mol, and about 225 kg/mol. In still further aspects, it is understood that the molecular weight of the multi-block polymer can have any value between any two foregoing values.

In still further aspects, the disclosed multi-block polymers can exhibit an electrical conductivity from about 1 S/cm to about 30 S/cm, including exemplary values of about 2 S/cm, about 5 S/cm, about 8 S/cm, about 10 S/cm, about 12 S/cm, about 15 S/cm, about 18 S/cm, about 20 S/cm, about 22 S/cm, about 25 S/cm, and about 28 S/cm. It is understood that the multi-block polymer can exhibit an electrical conductivity having any value between any two foregoing values.

In still further aspects, the multi-block polymers can exhibit an adhesion strength from about 1 MPa to about 30 MPa, including exemplary values of about 2 MPa, about 5 MPa, about 8 MPa, about 10 MPa, about 12 MPa, about 15 MPa, about 18 MPa, about 20 MPa, about 22 MPa, about 25 MPa, and about 28 MPa. It is understood that the multi-block polymer can exhibit an adhesion strength having any value between any two foregoing values.

In yet further aspects, the polyanion containing polymer segment A in the disclosed multi-block polymers has a molecular weight from greater than 0 kg/mol to less than 200 kg/mol.

In still further aspects, the polyanion-containing segment A has a glass transition temperature ($T_g$) from about −75° C. to about −15° C., including exemplary values of about −70° C., about −65° C., about −60° C., about −55° C., about −50° C., about −45° C., about −40° C., about −35° C., about −30° C., about −25° C., and about −20° C. In still further aspects, the polyanion-containing segment A can have a glass transition temperature having any value between any two foregoing values.

In still further aspects, the conjugated polymer segment B in the disclosed multi-block polymers has a molecular weight from greater than 0 kg/mol to less than 200 kg/mol. In some aspects, the degree of polymerization can be from about 15 to about 150, including exemplary values of about 20, about 30, about 40, about 50, about 60, about 70, about 80, about 90, about 100, about 110, about 120, about 130, and about 140. In yet other aspects, the degree of polymerization can have any value between any two foregoing values.

In still further aspects, the catechol-containing segment C in the disclosed multi-block polymers has a molecular weight from about greater than 0 kg/mol to less than 200 kg/mol.

In yet further aspects, the hard segment BC is present in an amount of about 15 to about 50% of the total segments present in the multi-block polymer, including exemplary values of about 20%, about 25%, about 30%, about 35%, about 40%, and about 45%.

In still further aspects, the catechol-containing polymer segment C is present in the hard segment BC in an amount from about 2% to about 10% of the hard segment, including exemplary values of about 3%, about 4%, about 5%, about 6%, about 7%, about 8%, and about 9%.

In still further aspects, the polyanion-containing polymer segment A can comprise any of the described above compounds. In still further aspects, the polyanion-containing polymer segment A can comprise a methacrylate-containing anionic monomer or a saturated fatty acid derivative. In still further aspects, the polyanion-containing monomer A can comprise a 3-sulfopropyl methacrylate (SPM), a sulfoethyl methacrylate, or a combination thereof.

In yet other aspects, the saturated fatty acid derivative can comprise a 12-(methacryloyloxy) dodecanoic acid.

In still further aspects, the catechol-containing segment C can comprise any of the above mentioned compounds. In yet, some exemplary aspects, the catechol-containing monomer C can comprise an N-methacryloyl-3,4-dihydroxyl-L-phenylalanine (MDOPA). In still further exemplary aspects, the catechol-containing monomer C is MDOPA.

In still further aspects, wherein the conjugated polymer segment B can comprise a substituted or unsubstituted polythiophene, poly(3-alkylthiophenes), polypyrrole, poly(isothianaphthene), poly(3,4-ethylenedioxythiophene), alkoxy-substituted poly(p-phenylene vinylene), poly(2,5-bis(cholestanoxy)phenylene vinylene, polyp-phenylene vinylene), poly(2,5-dialkoxy)paraphenylene vinylene, poly[(1,4-phenylene-1,2-diphenylvinylene)], poly(3',7'-dimethyloctyloxy phenylene vinylene, polyparaphenylene, ladder-type polyparaphenylene, polyparaphenylene sulphide, polyheptadiyne, poly(3-hexylthiophene), poly(3-octylthiophene), poly(3-cyclohexylthiophene), poly(3-methyl-4-cyclohexylthiophene), polyaniline, poly(2,5-dialkoxy-1,4-phenyleneethynylene), poly(3-octylthiophene), poly(2-decyloxy-1,4-phenylene), poly(9,9-dioctylflorene), thiopheneethylamine, or polyquinoline. In still further aspects, the conjugated polymer segment B comprises a substituted or unsubstituted polythiophene, polypyrrole, or polyaniline. In yet further aspects, the conjugated polymer segment B comprises substituted or unsubstituted polythiophene. In still further aspects, the conjugated polymer segment B can comprise a poly(3,4-ethylenedioxythiophene) polystyrene sulfonate (PEDOT).

In still further aspects, the polyanion-containing polymer segment A and the conjugated polymer segment B present in the disclosed multi-block polymer can form a stable matrix via electrostatic interaction between segment A and segment B. In still further aspects, the multi-block polymer is a self-doped conducting polymer. Without wishing to be bound by any theory, it is speculated that self-doping is due to the presence of a negatively charged anionic pendant group (sulfonate or carboxylate) as an immobilized dopant anion.

In yet further aspects, the multi-block polymer composition is hydrophilic. In yet further aspects, the multi-block polymer composition is hydrophobic.

In still further aspects, the disclosed multi-block polymer is a pressure-sensitive adhesive.

Also, in some aspects, disclosed herein are polymer blends. In such aspects, the polymer blend composition can comprise and an amount of a multi-block polymer BCACB comprising: i) a polyanion-containing polymer segment A; ii) a conjugated polymer segment B, and iii) a catechol-containing polymer segment C; wherein B and C together are hard segments and wherein A is a soft segment, b) an amount of a diblock copolymer composition of a type A'-B' co-polymer, wherein j) A'-is a polyanion-containing polymer segment; and jj) B' is a conjugated polymer segment; and wherein A' and A are the same or different, and wherein B and B' are the same or different.

In still further aspects, the polyanion-containing polymer segment A can comprise any of the described above compounds. In still further aspects, the conjugated polymer segment B can comprise any of the described above compounds. In still further aspects, the catechol-containing polymer segment C can comprise any of the described above compounds.

In still further aspects, the multi-block polymer BCACB is present an amount from about greater than 0% to less than 100% of the blend. In yet further aspects, the diblock copolymer composition of the type A'-B' is present in an amount from greater than 0% to less than 100% of the blend.

In still further aspects, the polyanion-containing segment A' can comprise any of the polyanion-containing segments A disclosed herein. In still further aspects, the polyanion-containing segment A' can be the same or different as the polyanion-containing segment A. In yet other aspects, the polyanion-containing polymer segment A' of the diblock copolymer composition is substantially similar to the polyanion-containing polymer segment A of the multi-block polymer prepared by the disclosed methods.

In still further aspects, the conjugated polymer segment B' can comprise any of the conjugated polymer segments B disclosed herein. In still further aspects, the conjugated polymer segment B' can be the same or different as the conjugated polymer segment B. In yet other aspects, the conjugated polymer segment B' of the diblock copolymer composition is substantially similar to conjugated polymer segment B of the multi-block polymer prepared by the disclosed methods.

In still further aspects, the blended polymer composition can exhibit an electrical conductivity from about 1 S/cm to about 30 S/cm, including exemplary values of about 2 S/cm, about 5 S/cm, about 8 S/cm, about 10 S/cm, about 12 S/cm, about 15 S/cm, about 18 S/cm, about 20 S/cm, about 22 S/cm, about 25 S/cm, and about 28 S/cm. It is understood that the blended polymer composition can exhibit an electrical conductivity having any value between any two foregoing values.

In still further aspects, the blended polymer composition can exhibit an adhesion strength from about 1 MPa to about 30 MPa, including exemplary values of about 2 MPa, about 5 MPa, about 8 MPa, about 10 MPa, about 12 MPa, about 15 MPa, about 18 MPa, about 20 MPa, about 22 MPa, about 25 MPa, and about 28 MPa. It is understood that the blended polymer composition can exhibit an adhesion strength having any value between any two foregoing values.

In some aspects, disclosed herein are adhesive conductive compositions comprising the disclosed multi-block polymer that can be used in a solvent-free system. In yet other aspects, disclosed herein are adhesive conductive compositions comprising the disclosed multi-block polymer that can be used in a solvent-based system. In such exemplary aspects, the disclosed adhesive conductive compositions can be configured to be swollen with a solvent to obtain predetermined viscoelasticity.

In other aspects, disclosed herein are adhesive conductive compositions comprising the blended polymer composition comprising the disclosed multi-block polymer BCACB and the diblock copolymer A'-B' that can be used in a solvent-free system. In yet other aspects, such adhesive conductive compositions can be used in a solvent-based system. In such exemplary aspects, the disclosed adhesive conductive compositions comprising the blended polymer composition comprising the disclosed multi-block polymer BCACB and the diblock copolymer A'-B' can be configured to be swollen with a solvent to obtain predetermined viscoelasticity.

In still further aspects, the disclosed multi-block polymers and the blended polymer compositions can be used as battery binders. In still further aspects, the disclosed multi-block polymers and the blended polymer compositions can be used in photovoltaics, electronic sensors, displays, and the like. In still further aspects, the disclosed multi-block polymers and the blended polymer compositions can be used in coating technologies. The disclosed conducting adhesives can be used as an anti-corrosive coating, as anti-fouling or anti-microbial coatings.

EXAMPLES

The following examples are put forth so as to provide those of ordinary skill in the art with a complete disclosure and description of how the compounds, compositions, articles, devices and/or methods claimed herein are made and evaluated and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1

The exemplary polymer was prepared by a metal-free photoredox ATRP reaction to minimize metal exposure to the final product. The soft segment was first prepared using alkyl halide ATRP initiator with 3-sulfopropyl methacrylate (SPM) followed by ATRP reaction of the second monomer, MDOPA. The ATRP occurred at both sides of the difunctional alkyl halide initiator. After the polymerization, the terminal bromine was converted to an azido group for the next click reaction (i.e., azide-alkyne cycloaddition). The separately prepared alkyne terminal poly(3-hexylthiophene) was covalently linked to the poly(MDOPA-block-SPM-block-MDOPA). Each step of the reaction was analyzed by an NMR to confirm the successful completion of the reaction. The synthesized linear multi-block polymer has hard terminal segments (poly(3-hexylthiophene) and polyMDOPA) and soft middle segments (polySPM). It was shown that the halide group at the terminal ends works well for multiple chain extensions. It was also shown that the use of Eosin Y to catalyze a photoredox ATRP reaction allows obtaining an efficient polymerization.

Example 2

To determine the effect of various structural features on the adhesion performance, three synthetic variables were assessed as follows. First, a segmental ratio and its effect on the electrical conductivity and adhesive properties of the final polymer can be determined. Thus, to assess the effect of the segmental ratios, the first 20% of the hard segment is tested for the disclosed multi-block polymers. Then, a longer hard segment (30% and 40%) is also tested to maximize electrical conductivity by using larger amounts of the conductive component. In such experiments, the proportion of the MDOPA segment is fixed at 5% as a small amount of catechol moiety can improve adhesion significantly.

Further, the effect of the overall molecular weight on polymer properties can be investigated. The effect of the overall molecular weight can be tested together with a segmental ratio because there is a possible variation of microphase morphology and properties over block polymer molecular weights. The segmental ratio analysis is initially performed with 100 kg/mol. In this case, the testing molecular weight range ranges between 50 kg/mol and 200 kg/mol.

Figures 4A, 4B:
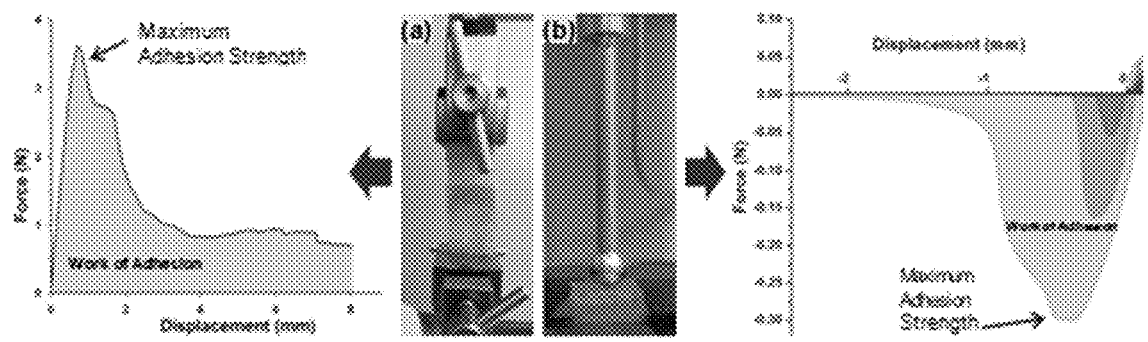
FIGS. 4A-4B depict exemplary adhesion tests.

The effect of the soft segment on the various polymer properties is also measured. The adhesion of the resulting polymers can be quantified by two types of adhesion tests, lap shear strength tests (FIG. 4A) and uniaxial indentation tests (FIG. 4B). The lap shear strength test is performed by a tensile tester (Shimadzu EZ-LX). Different types of testing substrates can be used to determine the adhesive properties of the disclosed polymer. In certain experiments, the testing substrates such as plastic, glass, wood, animal tissue, and metal are used. In the lap shear strength test, the adhesive is placed between testing strips under controlled weight, then the sample is drawn at a constant rate (typically 10 mm/min) until the adhesion fails. The total adhesion energy is determined by integrating the area under the obtained curve of adhesion force vs. displacement. The maximum adhesion force (N), which is another parameter of adhesion properties, is measured by reading a peak value of force vs. displacement plot, as shown in FIG. 4A.

In yet other experiments, a uniaxial indentation test can also be used to determine the adhesive properties of the disclosed polymer. The uniaxial indentation test uses a spherical objective as a contacting probe (FIG. 4B). Because of the hemispherical shape of the contacting probe, the uniaxial indentation test provides information about adhesion properties on non-flat surfaces. Therefore, the uniaxial indentation test offers realistic adhesion strength information for the pressure-sensitive adhesives. In this test, the contacting probe is pressed against the sample with a preload (typically 0.01-0.05 N), and then it is held for a predetermined time (30-600 seconds), and then it is retracted with the desired velocity (0.017-1.7 mm/s). The adhesion work is calculated by dividing the area of the stress-strain curve over the maximum contact area. The maximum adhesion force is a peak value of the obtained plot (FIG. 4B). The polymer structure can be tuned according to the desired adhesive properties.

Example 3

The hexyl substituted polythiophene is synthesized to evaluate its effect on the conductivity of the final polymer. The self-doping effect of the conducting polymers is then evaluated. This self-doping effect can arise from interactions between the polyanionic polymer segment and the conjugated polymer segment.

The polythiophene segment is synthesized by Ni-catalyzed cross-coupling polymerization (or catalyst-transfer polymerization) according to Scheme 6. The monomer, 2,5-dibromo-3-hexylthiophene, is commercially available and can also be synthesized by common synthetic methods. The polymerization of thiophene is terminated by a monofunctional transmetalating quenching agent, such as ethynylmagnesium bromide. The quenching agent provides an alkyne end group on the synthesized poly(3-hexylthiophene) (Scheme 6). The alkyne is used for a click reaction to the azide terminals on poly(MDOPA-block-SPM-block-MDOPA), as shown in Scheme 7. To evaluate the effect of the chain length of the polythiophene on viscoelasticity, adhesion, physical crosslinking, and conductive properties of the final polymer, various lengths of polythiophene are prepared. The length of the polythiophene can be controlled by the monomer to catalyst ratio. For the initial tests, degrees of polymerization of 20, 50, and 100 are prepared to investigate adhesion and conducting properties.

The probability of forming undesired products is evaluated. The alkyne quenching agent, such as, for example, ethynylmagnesium bromide, produces a mixture of monofunctionalized and difunctionalized polymer due to dissociation and/or disproportionation of the catalysts. In aspects where the polymer chain length is not long, the polymer is purified by a flash column chromatography. However, difunctionalization needs to be avoided when high molecular weight polythiophene is needed. In order to solve this issue, new catalysts having various substituted aryl initiator groups containing the Ni catalyst complex are evaluated. In some aspects, to prevent unwanted difunctionalization, a post polymerization modification (e.g., Sonogashira and Stille reaction) of the —Br end group of the polythiophene can be done.

Example 4

The electrical conductivity of the synthesized polymer having the desired structure is evaluated with a four-probe method using a LORESTA-GX/MCP-T700 (Mitsubishi, Japan). The prepared polymer is coated on a glass plate by a spin-coating technique. The thickness of the polymer film is measured by a scanning electron microscope (SEM) to calculate conductivity from the measured resistance through the four-probe method. The synergic contribution of catechol to the overall polymer conductivity due to its redox capability is then evaluated.

Example 5

To further evaluate how a specific conjugated polymer segment affects the overall conductivity of the final polymer, a PEDOT is used as the conjugated polymer segment. PEDOT includes an electron-donating ethylenedioxy bridge directly attached to a $\pi$-conjugated system of the polymer. To synthesize a multi-block polymer that comprises PEDOT as the conjugated polymer segment, an oxidative polymerization reaction is used, as shown in Scheme 8.

Example 6

The physical crosslinking level is evaluated to determine its effect on the adhesive and conductive properties of the polymer.

The presence of the physical crosslinking in the polymer matrix can be determined by various techniques, such as, for example, a transmission electron microscopy (TEM), an atomic force microscope (AFM), and a small-angle x-ray scattering (SAXS). The viscoelastic properties can be determined by any methods known in the art, for example, by rheometer. The TEM can also be used to measure the domain size and shape of various segments in the polymer matrix. The phase mode of the AFM can be used to characterize the hard segment with a dark color (bright color–soft segment) in the image. The SAXS patterns can be used to show nano-domains of the physical crosslinking. The arrangement of domains (morphology) can be determined from the measured q (scattering vector, peaks of the SAXS patterns). The domain spacing, $D=2\pi/q^*$, can be estimated using $q^*$, which is the primary peak of the SAXS pattern.

The polymers viscoelastic property is tested to evaluate whether the disclosed polymer can be used as a pressure-sensitive adhesive. The polymer is tested for the presence of the Dahlquist criterion and Chang's viscoelastic window. Dahlquist criterion requires the shear elastic modulus, G', to be lower than 0.1 MPa at a frequency of 1 Hz to have good wetting of a substrate during a one second contact time. Chang's viscoelastic window categorizes pressure-sensitive adhesives, according to G', G" (loss modulus), frequency, and temperature.

The dual role of the catechol (DOPA moiety) is also evaluated. The dual role of the catechol moiety is based on a strong interfacial adhesion and a possible conductivity enhancement. One of the catechol's structural features is a $\pi$-$\pi$ stacking. Without wishing to be bound by any theory, it is hypothesized that such a $\pi$-$\pi$ stacking can enhance electrical communication via hopping transport when the planes of the $\pi$-electronic states are packed face-to-face.

Example 7

Figures 5A, 5B:
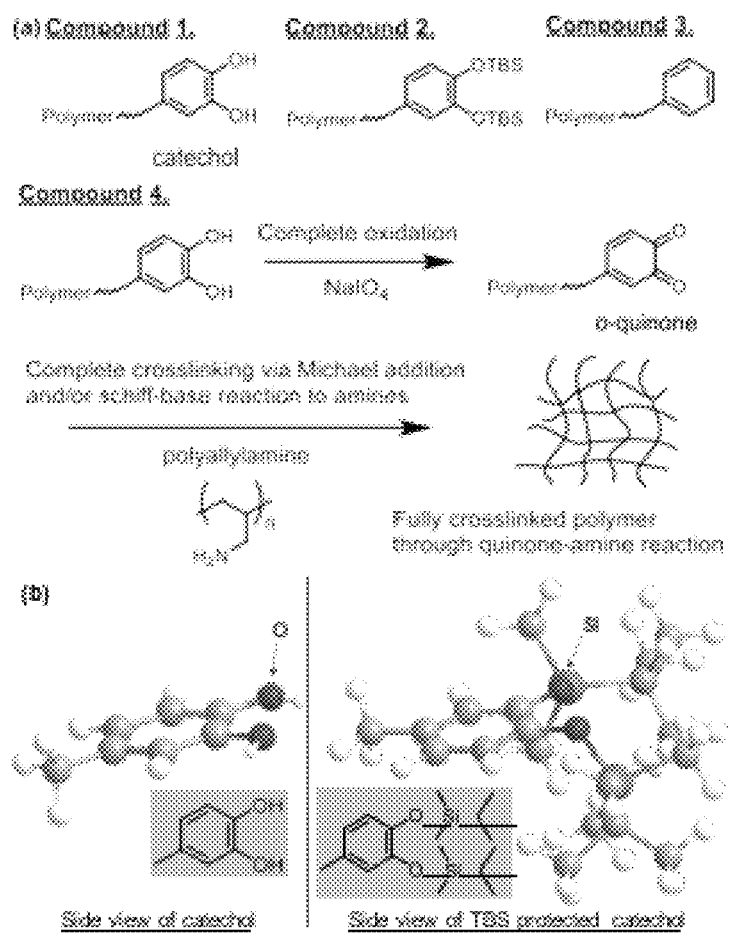
FIGS. 5A-5B depict schematics for the comparative study of catechol role in the conductivity control.

To evaluate the presence of the $\pi$-$\pi$ stacking effect and its effect on the catechol conductivity and adhesion, four model compounds are synthesized (as schematically shown in FIG. 5A and FIG. 5B)

The first synthesized model compound is a catechol containing polymer (compound 1) (FIG. 5A). The second synthesized compound is TBS protected catechol (FIG. 5 B and compound 2 in FIG. 5A). Without wishing to be bound by any theory, it is speculated that the bulky TBS can hinder the $\pi$-$\pi$ stacking. The third synthesized compound is pendant phenyl without hydroxyl groups on the aromatic ring. This model compound (compound 3, FIG. 5A) can reveal if the hydroxyl group on the aromatic ring has any effect on conductivity. Because phenyl does not undergo a redox reaction, the pendant phenyl can be a good comparison as an insulating polymer without conductivity. The fourth synthesized compound is a fully crosslinked catechol containing polymer (compound 4, FIG. 5A). Again, without wishing to be bound by any theory, it is hypothesized that compound 4 can mimic an aged catechol-containing polymer that is fully oxidized and then covalently crosslinked via Michael and Schiff-based reactions. The covalent crosslinking is an irreversible loss of catechol from the polymer. The catechol-crosslinking can lead to mechanical stiffening, and consequently, loss of flexible adhesion. The catechol-crosslinking can induce changes in conductivity due to no availability of the redox reaction and no $\pi$-$\pi$ stacking. The fourth model compound provides a piece of the experimental evidence on whether catechol-crosslinking affects conductivity. The schematic of compound 4 synthesis is shown in FIG. 5B. The four synthesized model compounds are further tested to measure their electrical conductivity. Those conductivity results have identified the role of the adhesive component (catechol) in conductivity.

Example 8

The blend of a diblock and multi-block polymer are prepared to evaluate changes in the adhesion and conductivity. Without wishing to be bound by any theory, it is hypothesized that such a blend can enhance the adhesion property because the diblock copolymers' high mobility can provide additional relaxation to the polymer molecule. In addition, the blended diblock copolymer can offer higher conductivity because the blended polythiophene segments can provide an additional conjugated polymer component that can link the polythiophene domains of the multi-block polymer.

The diblock copolymer can be prepared using monofunctional alkyl halide initiator, ethyl α-bromoisobutyrate, for ATRP reaction.

The new conducting adhesives described herein are designed to be used in a solvent-free system. However, if the polymer is too stiff to show flexibility, then the polymer can be swollen with a solvent (e.g., water) as an alternative. Because the new middle segments are polyanions, the multi-block polymer can be swollen in water to obtain the required viscoelasticity. In such a case, the described characterization is performed with the water-swollen multi-block polymers.

The above specification and examples provide a complete description of the structure and use of illustrative embodiments. Although certain embodiments have been described above with a certain degree of particularity or with reference to one or more individual embodiments, those skilled in the art could make numerous alterations to the disclosed embodiments without departing from the scope of this invention. As such, the various illustrative embodiments of the devices are not intended to be limited to the particular forms disclosed. Rather, they include all modifications and alternatives falling within the scope of the claims, and embodiments other than the one shown may include some or all of the features of the depicted embodiment. For example, components may be omitted or combined as a unitary structure, and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

Aspects

In view of the described processes and compositions, hereinbelow are described certain more particularly described aspects of the inventions. These particularly recited aspects should not, however, be interpreted to have any limiting effect on any different claims containing different or more general teachings described herein, or that the "particular" aspects are somehow limited in some way other than the inherent meanings of the language and formulas literally used therein.

Aspect 1: A multi-block polymer BCACB comprising: a) a polyanion-containing polymer segment A; b) a conjugated polymer segment B, and c) a catechol-containing polymer segment C; wherein B and C together are hard segments and wherein A is a soft segment.

Aspect 2: The multi-block polymer of Aspect 1, wherein the multi-block polymer is a linear polymer having a molecular weight of about 50 kg/mol to about 200 kg/mol.

Aspect 3: The multi-block polymer of Aspect 1 or claim 2, wherein the multi-block polymer exhibits an electrical conductivity from about 1 to about 30 S/cm.

Aspect 4: The multi-block polymer of any one of Aspects 1-3, wherein the multi-block polymer exhibits an adhesion strength of about 1 to about 30 MPa.

Aspect 5: The multi-block polymer of any one of Aspects 1-4, wherein the polyanion containing polymer segment A has a molecular weight from greater than 0 kg/mol to less than 200 kg/mol.

Aspect 6: The multi-block polymer of any one of Aspects 1-5, wherein the conjugated polymer segment B has a molecular weight from greater than 0 kg/mol to less than 200 kg/mol.

Aspect 7: The multi-block polymer of any one of Aspects 1-6, wherein the catechol-containing segment C has a molecular weight from greater than 0 kg/mol to less than 200 kg/mol.

Aspect 8: The multi-block polymer of any one of Aspects 1-7, wherein the polyanion-containing segment A has a glass transition temperature ($T_g$) from about −75° C. to about −15° C. and is positioned in the center of the linear multi-block polymer composition.

Aspect 9: The multi-block polymer of Aspect 8, wherein the hard segment is present in about 15-50% of the total segments present in the polymer.

Aspect 10: The multi-block polymer of Aspect 9, wherein the catechol-containing polymer segment C is present in the hard segment BC in about 2% to about 10% of the hard segment.

Aspect 11: The multi-block polymer of any one of Aspects 1-10, wherein the polyanion-containing polymer segment A comprises a methacrylate-containing anionic monomer or a saturated fatty acid derivative.

Aspect 12: The multi-block polymer of Aspect 11, wherein the methacrylate-containing anionic monomer comprises a 3-sulfopropyl methacrylate (SPM)

Aspect 13: The multi-block polymer of Aspect 11, wherein the saturated fatty acid derivative comprises a 12-(methacryloyloxy) dodecanoic.

Aspect 14: The multi-block polymer of any one of Aspects 1-13, wherein the catechol-containing segment C comprises a poly(N-methacryloyl-3,4-dihydroxyl-L-phenylalanine (polyMDOPA).

Aspect 15: The multi-block polymer of any one of Aspects 1-14, wherein the conjugated polymer segment B comprises a substituted or unsubstituted polythiophene, polypyrrole, or polyaniline.

Aspect 16: The multi-block polymer of Aspect 15, wherein the substituted or unsubstituted polythiophene has a degree of polymerization from about 15 to about 150.

Aspect 17: The multi-block polymer of any one of Aspect 15 or 16, wherein the polythiophene comprises a poly(3-hexylthiophene) or a poly(3,4-ethylenedioxythiophene) polystyrene sulfonate (PEDOT).

Aspect 18: The multi-block polymer of any one of Aspects 1-17, wherein the polyanion-containing polymer segment A and the conjugated polymer segment B form a stable matrix via electrostatic interaction.

Aspect 19: The multi-block polymer of any one of Aspects 13-18, wherein the multi-block polymer composition is hydrophobic.

Aspect 20: A polymer blend composition comprising: a) an amount of a multi-block polymer BCACB comprising: i) a polyanion-containing polymer segment A; ii) a conjugated polymer segment B, and iii) a catechol-containing polymer segment C; wherein B and C together are hard segments and wherein A is a soft segment, b) an amount of a diblock copolymer composition of a type A'-B' co-polymer, wherein j) A'-is a polyanion-containing polymer segment; and jj) B' is a conjugated polymer segment; and wherein A' and A are the same or different, and wherein B and B' are the same or different.

Aspect 21: The polymer blend composition of Aspect 20, wherein the multi-block polymer has a molecular weight of about 50 kg/mol to about 200 kg/mol.

Aspect 22: The polymer blend composition of Aspects 20 or 21, wherein the polyanion-containing polymer segment A' has a molecular weight from greater than 0 kg/mol to less than about 200 kg/mol.

Aspect 23: The polymer blend composition of any one of Aspects 20-22, wherein the conjugated polymer segment B has a molecular weight from greater than 0 kg/mol to less than about 200 kg/mol.

Aspect 24: The polymer blend composition of any one of Aspects 20-23, exhibiting an electrical conductivity from about 1 to about 30 S/cm.

Aspect 25: The polymer blend composition of any one of Aspects 20-24, exhibiting an adhesion strength of about 1 to about 30 MPa.

Aspect 26: The polymer blend composition of any one of Aspects 20-25, wherein the amount of the multi-block polymer is from greater than 0% to less than 100% of the blend.

Aspect 27: The polymer blend composition of any one of Aspects 20-26, wherein the amount of the diblock copolymer composition is from greater than 0% to less than 100% of the blend.

Aspect 28: The polymer blend composition of any one of Aspects 20-27, wherein the polyanion containing polymer segment A has a molecular weight from about greater than 0 kg/mol to less than 200 kg/mol.

Aspect 29: The polymer blend composition of any one of Aspects 20-28, wherein the catechol-containing polymer segment C has a molecular weight from about greater than 0 kg/mol to less than 200 kg/mol.

Aspect 30: The polymer blend composition of any one of Aspects 20-29, wherein the conjugated polymer segment B has a molecular weight from about greater than 0 kg/mol to less than 200 kg/mol.

Aspect 31: The polymer blend composition of any one of Aspects 20-30, wherein the polyanion-containing polymer segment A has a glass transition temperature ($T_g$) from about −75° C. to about −15° C. and is positioned in the center of the linear multi-block polymer composition.

Aspect 32: The polymer blend composition of any one of Aspects 20-31, wherein the polyanion-containing segment A comprises from greater than 0 to less than 100% of the total segments present in the multi-block polymer.

Aspect 33: The polymer blend composition of Aspect 32, wherein the hard segment is present in about 15-50% of the total segments present in the multi-block polymer.

Aspect 34: The polymer blend composition of Aspect 33, wherein the catechol-containing segment C is present in the hard segment in about 2% to about 10% of the hard segment present in the polymer.

Aspect 35: The polymer blend composition of any one of Aspects 20-34, wherein the polyanion-containing polymer segment A comprises a methacrylate-containing anionic monomer or a saturated fatty acid derivative.

Aspect 36: The polymer blend composition of Aspect 45, wherein the methacrylate-containing anionic monomer comprises a 3-sulfopropyl methacrylate (SPM).

Aspect 37: The polymer blend composition of Aspect 38, wherein the saturated fatty acid derivative comprises a 12-(methacryloyloxy) dodecanoic acid.

Aspect 38: The polymer blend composition of any one of Aspects 20-37, wherein the catechol-containing polymer segment C comprises a poly(N-methacryloyl-3,4-dihydroxyl-L-phenylalanine (polyMDOPA).

Aspect 39: The polymer blend composition of any one of Aspects 20-38, wherein the conjugated polymer segment B comprises a substituted or unsubstituted polythiophene, polypyrrole, or polyaniline.

Aspect 40: The polymer blend composition of Aspect 39, wherein the substituted or unsubstituted polythiophene has a degree of polymerization from about 15 to about 150.

Aspect 41: The polymer blend composition of any one of Aspects 39-40, wherein the polythiophene comprises a poly(3-hexylthiophene) or a poly(3,4-ethylenedioxythiophene) polystyrene sulfonate (PEDOT).

Aspect 42: The polymer blend composition of any one of Aspects 20-41, wherein the polyanion-containing polymer segment A and the conjugated polymer segment B form a stable matrix via electrostatic interaction.

Aspect 43: The polymer blend composition of any one of Aspects 37-42, wherein the multi-block polymer composition is hydrophobic.

Aspect 44: The polymer blend composition of any one of Aspects 20-43, wherein the polyanion-containing polymer segment A' of the diblock copolymer composition is substantially similar to the polyanion-containing segment A of the multi-block polymer.

Aspect 45: The polymer blend composition of any one of Aspects 20-44, wherein the conjugated polymer segment B' of the diblock copolymer composition is substantially similar to the conjugated polymer segment B of the multi-block polymer.

Aspect 46: A method comprising: polymerizing a polyanion-containing monomer A to form a polyanion-containing polymer segment A having a first end and a second end; reacting the polyanion-containing polymer segment A with a catechol-containing monomer C, such that a first catechol-containing polymer segment C is bonded to the first end of the polyanion-containing polymer segment A and a second catechol-containing polymer segment C is bonded to the second end of the polyanion-containing polymer segment A, thereby forming a linear block CAC comprising a first terminal end and a second terminal end along a main polymer chain; and covalently bonding a monomer of a conjugated polymer B to the first and the second catechol-containing polymer segment C to form a first and a second conjugated polymer segments B; thereby forming a multi-block polymer of formula BCACB, wherein B and C together are hard segments, and wherein A is a soft segment.

Aspect 47: The method of Aspect 46, wherein the multi-block polymer of formula BCACB has a molecular weight of about 50 kg/mol to about 200 kg/mol.

Aspect 48: The method of Aspect 46 or 47, wherein the multi-block polymer exhibits an electrical conductivity from about 1 to about 30 S/cm.

Aspect 49: The method of any one of Aspects 46-48, wherein the multi-block polymer exhibits an adhesion strength of about 1 to about 30 MPa.

Aspect 50: The method of any one of Aspects 46-49, wherein the polyanion-containing monomer A comprises a methacrylate-containing anionic monomer or a saturated fatty acid derivative.

Aspect 51: The method of Aspect 50, wherein the polyanion-containing monomer A comprises a 3-sulfopropyl methacrylate (SPM).

Aspect 52: The method of Aspect 50, wherein the saturated fatty acid derivative comprises a 12-(methacryloyloxy) dodecanoic acid.

Aspect 53: The method of any one of Aspects 46-52, wherein the catechol-containing monomer C comprises an (N-methacryloyl-3,4-dihydroxyl-L-phenylalanine (MDOPA).

Aspect 54: The method of any one of Aspects 46-53, wherein the monomer of the conjugated polymer B comprises a substituted or unsubstituted polythiophene, polypyrrole, or polyaniline.

Aspect 55: The method of Aspect 54, wherein the monomer of the conjugated polymer B comprises substituted or unsubstituted polythiophene.

Aspect 56: The method of any one of Aspects 46-55, wherein the step of polymerizing the polyanion-containing monomer A to form the polyanion-containing polymer segment A comprises an atom transfer radical polymerization (ATRP) of the polyanion-containing monomer.

Aspect 57: The method of Aspect 56, wherein the ATRP is conducted in the presence of a first ATRP initiator.

Aspect 58: The method of Aspect 57, wherein the first ATRP initiator comprises a first alkyl halide initiator comprising one or more halogen atoms.

Aspect 59: The method of any one of Aspects 46-58, wherein the step of reacting comprises an atom transfer radical polymerization (ATRP) of the polyanion-containing polymer segment A with the catechol-containing monomer C in the presence of a second ATRP initiator.

Aspect 60: The method of Aspect 59, wherein the second ATRP initiator comprises a second alkyl halide initiator comprising one or more halogen atoms.

Aspect 61: The method of Aspect 60, wherein the first and the second terminal ends along a main polymer of the linear block CAC comprises a halide atom.

Aspect 62: The method of Aspect 61, wherein the method further comprises a step of converting each of the halide terminal ends of the linear block CAC to an azido functionalized terminal ends and wherein the step of converting occurs before the step of covalently bonding.

Aspect 63: The method of any one of Aspect 46-62, wherein the monomer of the conjugated polymer B comprises an alkyne functionality.

Aspect 64: The method of Aspect 63, wherein the step of covalently bonding comprises an alkyne-azide click reaction between the monomer of the conjugated polymer B and the azido terminal ends of the linear block CAC.

Aspect 65: The method of any one of Aspects 46-64, wherein the monomer of the conjugated polymer B is formed by a catalyst-transfer polymerization.

Aspect 66: The method of any one of Aspects 46-65, wherein the monomer of the conjugated polymer B has a degree of polymerization from about 15 to about 150.

Aspect 67: The method of any one of Aspects 46-61 or 65-66, wherein the monomer of the conjugated polymer B comprises a 3,4-ethylenedioxythiophene (EDOT) monomer.

Aspect 68: The method of Aspect 67, wherein the step of covalently bonding comprises oxidative polymerization of the 3,4-ethylenedioxythiophene (EDOT) to form a poly(3, 4-ethylenedioxythiophene) (PEDOT) segment on the first and the second terminal ends of the linear block CAC.

Aspect 69: The method of any one of Aspects 46-68, further comprising reacting a catechol functionality of the catechol-containing monomer C with a protective group before the step of reacting the polyanion-containing polymer segment A with the catechol-containing monomer C.

Aspect 70: The method of any one of Aspects 46-69, further comprising reacting a catechol functionality of each of the catechol-containing segments C in the linear CAC block with a protective group before the step of covalently bonding.

Aspect 71: The method of Aspect 69 or 70, wherein the protective group comprises t-butyldimethylsilyl chloride.

Aspect 72: The method of any one of Aspects 73-75, wherein the protective group is removed after the step of covalently bonding.

Aspect 73: A method of forming a blended polymer composition comprising: mixing an amount of the multi-block polymer prepared by the method of any one of claims 49-76 with an amount of a diblock copolymer composition of a type A'-B' co-polymer, wherein: a) A'-is polyanion-containing segment; and b) B' is a conjugated polymer segment; wherein A' and A are the same or different, and wherein B' and B are the same or different.

Aspect 74: The method of any one of Aspect 73, wherein the blended polymer composition exhibits an electrical conductivity from about 1 to about 30 S/cm.

Aspect 75: The method of any one of Aspects 73 or 74, wherein the blended polymer composition exhibits an adhesion strength of about 1 to about 30 M Pa.

Aspect 76: The method of any one of Aspects 73-75, wherein the amount of the multi-block polymer is from greater than 0% to less than 100% of the blend.

Aspect 77: The method of any one of Aspects 73-76, wherein the amount of the diblock copolymer composition is from greater than 0% to less than 100% of the blend.

Aspect 78: The method any one of Aspects 73-77, wherein the polyanion-containing polymer segment A' of the diblock copolymer composition is substantially similar to the polyanion-containing polymer segment A of the multi-block polymer.

Aspect 79: The method of any one of Aspects 73-78, wherein the conjugated polymer segment B' of the diblock copolymer composition is substantially similar to the conjugated polymer segment B of the multi-block polymer.

Aspect 80: An adhesive conductive composition comprising the multi-block polymer of any one of Aspects 1-19, wherein the adhesive conductive composition is used in a solvent-free system.

Aspect 81: An adhesive conductive composition comprising the multi-block polymer of any one of Aspects 1-19 is configured to be swollen with a solvent to obtain predetermined viscoelasticity.

Aspect 82: An adhesive conductive composition comprising the blended polymer composition of any one of Aspects 20-45, wherein the adhesive conductive composition is used in a solvent-free system.

Aspect 83: An adhesive conductive composition comprising the blended polymer composition of any one of Aspects 20-45 is configured to be swollen with a solvent to obtain predetermined viscoelasticity.

What is claimed is:

1. A multi-block polymer BCACB comprising:
   a) a polyanion-containing polymer segment A;
   b) a conjugated polymer segment B, and
   c) a catechol-containing polymer segment C;
   wherein B and C together are hard segments, and wherein A is a soft segment,
   wherein the multi-block polymer is a linear polymer having a total molecular weight of about 50 kg/mol to about 200 kg/mol; and wherein the multi-block polymer exhibits an electrical conductivity from about 1 to about 30 S/cm and an adhesion strength of about 1 to about 30 MPa.

2. The multi-block polymer of claim 1, wherein the hard segments is present in about 15-50% of the total segments present in the polymer.

3. The multi-block polymer of claim 1, wherein the catechol-containing polymer segment C is present in the hard segments BC in about 2% to about 10% of the hard segments.

4. The multi-block polymer of claim 1, wherein the polyanion-containing polymer segment A comprises a methacrylate-containing anionic monomer or a saturated fatty acid derivative.

5. The multi-block polymer of claim 4, wherein the methacrylate-containing anionic monomer comprises a 3-sulfopropyl methacrylate (SPM) or wherein the saturated fatty acid derivative comprises a 12-(methacryloyloxy) dodecanoic acid.

6. The multi-block polymer claim 1, wherein the catechol-containing segment C comprises a poly(N-methacryloyl-3,4-dihydroxyl-L-phenylalanine (polyMDOPA).

7. The multi-block polymer of claim 1, wherein the conjugated polymer segment B comprises a substituted or unsubstituted polythiophene, polypyrrole, or polyaniline.

8. The multi-block polymer of claim 7, wherein the polythiophene comprises a poly(3-hexylthiophene) or a poly(3,4-ethylenedioxythiophene) polystyrene sulfonate (PEDOT).

9. A polymer blend composition comprising:
a) from greater than 0% to less than 100% of a multi-block polymer BCACB comprising:
  i) a polyanion-containing polymer segment A;
  ii) a conjugated polymer segment B, and
  iii) a catechol-containing polymer segment C;
  wherein B and C together are hard segments and wherein A is a soft segment, wherein the multi-block polymer is a linear polymer having a total molecular weight of about 50 kg/mol to about 200 kg/mol,
b) from greater than 0% to less than 100% of a diblock copolymer composition of a type A'-B' co-polymer, wherein
j) A'-is a polyanion-containing polymer segment; and
jj) B' is a conjugated polymer segment; and
wherein A' and A are the same or different, and wherein B and B' are the same or different; and
wherein the polymer blend exhibits an electrical conductivity from about 1 to about 30 S/cm and exhibiting an adhesion strength of about 1 to about 30 MPa.

10. The polymer blend composition of claim 9, wherein the polyanion-containing segment A comprises from greater than 0 to less than 100% of the total segments present in the multi-block polymer; or wherein the hard segments is present in about 15-50% of the total segments present in the multi-block polymer; or wherein the catechol-containing segment C is present in the hard segments in about 2% to about 10% of the hard segments present in the polymer.

11. The polymer blend composition claim 10, wherein the polyanion-containing polymer segment A' of the diblock copolymer composition is substantially similar to the polyanion-containing segment A of the multi-block polymer.

12. The polymer blend composition of claim 10, wherein the conjugated polymer segment B' of the diblock copolymer composition is substantially similar to the conjugated polymer segment B of the multi-block polymer.

13. A method comprising:
polymerizing a polyanion-containing monomer A to form a polyanion-containing polymer segment A having a first end and a second end;
reacting the polyanion-containing polymer segment A with a catechol-containing monomer C, such that a first catechol-containing polymer segment C is bonded to the first end of the polyanion-containing polymer segment A and a second catechol-containing polymer segment C is bonded to the second end of the polyanion-containing polymer segment A, thereby forming a linear block CAC comprising a first terminal end and a second terminal end along a main polymer chain; and
covalently bonding a monomer of a conjugated polymer B to the first and the second catechol-containing polymer segment C to form a first and a second conjugated polymer segments B, wherein the monomer of the conjugated polymer B comprises at least one alkyne functionality;
thereby forming a multi-block polymer of formula BCACB,
wherein B and C together are hard segments, and wherein A is a soft segment;
wherein the multi-block polymer of formula BCACB has a total molecular weight of about 50 kg/mol to about 200 kg/mol; and
wherein the multi-block polymer exhibits an electrical conductivity from about 1 to about 30 S/cm.

14. The method of claim 13, wherein the step of polymerizing the polyanion-containing monomer A to form the polyanion-containing polymer segment A comprises an atom transfer radical polymerization (ATRP) of the polyanion-containing monomer in the presence of a first ATRP initiator comprising a first alkyl halide initiator comprising one or more halogen atoms.

15. The method of claim 14, wherein the step of reacting comprises an atom transfer radical polymerization (ATRP) of the polyanion-containing polymer segment A with the catechol-containing monomer C in the presence of a second ATRP initiator comprising a second alkyl halide initiator comprising one or more halogen atoms.

16. The method of claim 15, wherein the first and the second terminal ends along a main polymer of the linear block CAC comprise a halide atom.

17. The method of claim 16, wherein the method further comprises a step of converting each of the halide terminal ends of the linear block CAC to an azido functionalized terminal ends and wherein the step of converting occurs before the step of covalently bonding.

18. The method of claim 17, wherein the step of covalently bonding comprises an alkyne-azide click reaction between the monomer of the conjugated polymer B and the azido terminal ends of the linear block CAC.

19. The method of claim 16, wherein the step of covalently bonding comprises oxidative polymerization of the monomer of the conjugated polymer B comprising a 3,4-ethylenedioxythiophene (EDOT) monomer to form a poly(3,4-ethylenedioxythiophene) (PEDOT) segment on the first and the second terminal ends of the linear block CAC.

20. The method of claim 13, further comprising reacting a catechol functionality of the catechol-containing monomer C with a protective group before the step of reacting the polyanion-containing polymer segment A with the catechol-containing monomer C.

21. The method of claim 13, further comprising reacting a catechol functionality of each of the catechol-containing segments C in the linear CAC block with a protective group before the step of covalently bonding.

22. The method of claim 21, wherein the protective group is removed after the step of covalently bonding.

23. A method of forming a blended polymer comprising:
mixing greater than 0 wt % to less than about 100 wt % of the multi-block polymer composition prepared by the method of claim 13 with greater than 0 wt % to less than about 100 wt % of a diblock copolymer composition of a type A'-B' co-polymer, wherein:
   a) A'-is polyanion-containing segment; and
   b) B' is a conjugated polymer segment;
wherein A' and A are the same or different, and wherein B' and B are the same or different; and
wherein the blended polymer composition exhibits an electrical conductivity from about 1 to about 30 S/cm and an adhesion strength of about 1 to about 30 MPa.

* * * * *